(12) United States Patent
Mian

(10) Patent No.: US 10,471,976 B2
(45) Date of Patent: *Nov. 12, 2019

(54) RAILWAY MAINTENANCE DEVICE

(71) Applicant: International Electronic Machines Corporation, Troy, NY (US)

(72) Inventor: Zahid F. Mian, Loudonville, NY (US)

(73) Assignee: International Electronic Machines Corp., Troy, NY (US)

( * ) Notice: Subject to any disclaimer, the term of this patent is extended or adjusted under 35 U.S.C. 154(b) by 253 days.

This patent is subject to a terminal disclaimer.

(21) Appl. No.: 15/201,336

(22) Filed: Jul. 1, 2016

(65) Prior Publication Data

US 2016/0313739 A1 Oct. 27, 2016

Related U.S. Application Data

(63) Continuation of application No. 14/074,945, filed on Nov. 8, 2013, now Pat. No. 9,383,752, which is a
(Continued)

(51) Int. Cl.
*B61G 7/04* (2006.01)
*B25J 5/00* (2006.01)
*G05D 1/02* (2006.01)

(52) U.S. Cl.
CPC ............... *B61G 7/04* (2013.01); *B25J 5/005* (2013.01); *B25J 5/007* (2013.01); *G05D 1/0229* (2013.01);
(Continued)

(58) Field of Classification Search
CPC ......... B61G 7/04; B25J 5/007; G05D 1/0231; G05D 1/0276; G05D 1/0274; G05D 1/0229
See application file for complete search history.

(56) References Cited

U.S. PATENT DOCUMENTS

| 1,028,831 A | 6/1912 | Stagg |
| 1,824,108 A | 9/1931 | Abendroth |

(Continued)

FOREIGN PATENT DOCUMENTS

| GB | 2352486 A | 1/2001 |
| JP | 2002019606 | 1/2002 |

OTHER PUBLICATIONS

S. Hirose, T. Shirasu, and E. Fukushima, "Proposal for cooperative robot "Gunryu" composed of autonomous segments," Robotics and Autonomous System 17, 1996, pp. 107-118.*

(Continued)

*Primary Examiner* — Peter D Nolan
(74) *Attorney, Agent, or Firm* — LaBatt, LLC

(57) ABSTRACT

A railway maintenance device configured for autonomous or semi-autonomous operation in a rail environment is provided. The device can process image data to move about the rail environment and perform one or more actions in the rail environment. The actions can include one or more actions related to decoupling and/or attaching rail vehicles, and can be implemented by performing three-dimensional image processing. The device can be configured to move with any movement of a rail vehicle on which one or more actions are being performed. In an alternative embodiment, the various components configured to perform the action are implemented at a stationary location with respect to a rail line.

20 Claims, 11 Drawing Sheets

Related U.S. Application Data continuation of application No. 12/563,577, filed on Sep. 21, 2009, now Pat. No. 8,583,313.

(60) Provisional application No. 61/136,624, filed on Sep. 19, 2008.

(52) U.S. Cl.
CPC ......... *G05D 1/0231* (2013.01); *G05D 1/0274* (2013.01); *G05D 1/0276* (2013.01)

(56) References Cited

U.S. PATENT DOCUMENTS

| | | | |
|---|---|---|---|
| 3,132,749 A | 5/1964 | Whitehouse et al. | |
| 3,211,907 A | 10/1965 | Blaisdell et al. | |
| 3,247,509 A | 4/1966 | Hamann et al. | |
| 3,558,876 A | 1/1971 | Tillman et al. | |
| 3,682,325 A | 8/1972 | Peterson et al. | |
| 3,721,821 A | 3/1973 | Blanyer | |
| 3,736,420 A | 3/1973 | Elder et al. | |
| 3,750,897 A | 8/1973 | Murato et al. | |
| 3,854,598 A | 12/1974 | Yamazaki et al. | |
| 4,288,689 A | 9/1981 | Lemelson et al. | |
| 4,532,511 A | 7/1985 | Lemelson | |
| 4,610,206 A | 9/1986 | Kubala et al. | |
| 4,779,203 A | 10/1988 | McClure et al. | |
| 4,904,939 A | 2/1990 | Mian | |
| 4,947,353 A | 8/1990 | Quinlan, Jr. | |
| 4,973,215 A * | 11/1990 | Karlen | B25J 9/04 414/729 |
| 5,062,673 A | 11/1991 | Mimura | |
| 5,139,161 A | 8/1992 | Long | |
| 5,181,472 A | 1/1993 | Scheuchzer | |
| 5,433,111 A | 7/1995 | Hershey et al. | |
| 5,531,337 A * | 7/1996 | Cappelletti | B61G 7/04 213/211 |
| 5,550,953 A | 8/1996 | Seraji | |
| 5,636,026 A | 6/1997 | Mian et al. | |
| 5,678,789 A | 10/1997 | Pipich | |
| 5,737,500 A | 4/1998 | Seraji et al. | |
| 5,828,979 A | 10/1998 | Polivka et al. | |
| 6,125,311 A | 9/2000 | Lo | |
| 6,397,130 B1 | 5/2002 | Carr et al. | |
| 6,416,020 B1 | 7/2002 | Gronskov | |
| 6,484,074 B1 | 11/2002 | Hazard et al. | |
| 6,523,411 B1 | 2/2003 | Mian et al. | |
| 6,636,814 B1 | 10/2003 | McCullers et al. | |
| 6,655,502 B2 | 12/2003 | Sokoll et al. | |
| 6,681,160 B2 | 1/2004 | Bidaud | |
| 6,768,551 B2 | 7/2004 | Mian et al. | |
| 6,922,632 B2 | 7/2005 | Foxlin | |
| 6,957,780 B2 | 10/2005 | Rosa | |
| 7,213,789 B1 | 5/2007 | Matzan | |
| 7,328,871 B2 | 2/2008 | Mace et al. | |
| 7,438,075 B1 | 10/2008 | Huntington et al. | |
| 7,593,795 B2 | 9/2009 | Kane et al. | |
| 7,748,900 B2 | 7/2010 | Maschke | |
| 7,974,736 B2 | 7/2011 | Morin et al. | |
| 8,002,365 B2 | 8/2011 | Jacobsen et al. | |
| 8,140,250 B2 | 3/2012 | Mian et al. | |
| 8,583,313 B2 | 11/2013 | Mian | |
| 8,655,540 B2 | 2/2014 | Mian et al. | |
| 9,383,752 B2 | 7/2016 | Mian | |
| 2002/0007289 A1 | 1/2002 | Malin et al. | |
| 2002/0101361 A1 | 8/2002 | Barich et al. | |
| 2003/0072001 A1 | 4/2003 | Mian et al. | |
| 2004/0049327 A1 | 3/2004 | Kondratenko et al. | |
| 2004/0068361 A1 | 4/2004 | Cross et al. | |
| 2004/0181321 A1 | 9/2004 | Fries et al. | |
| 2004/0194549 A1 | 10/2004 | Noel | |
| 2005/0226201 A1 | 10/2005 | McMillin | |
| 2005/0258943 A1 | 11/2005 | Mian et al. | |
| 2005/0259273 A1 | 11/2005 | Mian et al. | |
| 2006/0231685 A1 | 10/2006 | Mace et al. | |
| 2007/0061041 A1 * | 3/2007 | Zweig | G05D 1/0261 700/245 |
| 2007/0061043 A1 | 3/2007 | Ermakov et al. | |
| 2007/0064244 A1 | 3/2007 | Mian et al. | |
| 2007/0075192 A1 | 4/2007 | Mian et al. | |
| 2007/0233333 A1 | 10/2007 | Moffett et al. | |
| 2008/0149782 A1 | 6/2008 | Tiwari et al. | |
| 2008/0297590 A1 | 12/2008 | Barber et al. | |
| 2008/0304065 A1 | 12/2008 | Hesser et al. | |
| 2008/0306705 A1 | 12/2008 | Luo et al. | |
| 2010/0068024 A1 | 3/2010 | Agens | |
| 2010/0263948 A1 | 10/2010 | Couture et al. | |

OTHER PUBLICATIONS

Edwards et al., "Improving the Efficiency and Effectiveness of Railcar Safety Appliance Inspection Using Machine Vision Technology," In. Proc. Joint Rail Conference, Apr. 2006, pp. 81-89.

Hirose et al., "Proposal for cooperative robot "Gunryu" composed of autonomous segments," Robotics and Autonomous System 17, 1996, pp. 107-118.

Ikeda et al., "Asymptotic stable Guidance Control of PWS Mobile Manipulator and Dynamical Influence of Slipping Carrying Object to Stability," In. Proc. IEEE/RSJ Intl. Conference on Intelligent Robots and Symptoms, Oct. 2003, pp. 2917-2202.

Katz et al., "The UMass Mobile Manipulator UMan: An Experimental Platform for Autonomous Mobile Manipulation," In. Proc. RSS Workshop Manipulation for Human Environments, Philadelphia, PA, Aug. 2006, 8 pages.

Shughart et al., "A Comprehensive Decision Support System for Hump Yard Management Using Simulation and Optimization," Innovative Scheduling, Inc., Gainesville, Florida, Aug. 1, 2006, 44 pages.

Sukumar et al., "Robotic Three-Dimensional Imaging System for Under-Vehicle Inspection", Journal of Electronic Imaging, vol. 15, No. 3, 2006, 11 pages.

Unknown, "Point Grey Research Inc.," accessed from http://www.ptgrey.com, date unknown, printed on Jan. 30, 2008, 1 page.

Unknown, "Selkirk Yard," accessed from http://www.trainweb.org/railnuts/yard.html, date unknown, printed on Dec. 14, 2007, 6 pages.

Unknown, "Sick IVP—A New Dimension in Vision," accessed from http://www.sickivp.se/sickivp/en.html, date unknown, printed on Jan. 30, 2008, 1 page.

Unknown, "Videre Design," accessed from http://www.videredesign.com, date unknown, printed on Jan. 30, 2008, 1 page.

Yamamoto et al., "Optical Sensing for Robot Perception and Localization," 2005 IEEE Workshop on Advanced Robotics and its Social Impacts, Nagoya, Japan, Jun. 12-15, 2005.

Nolan, P., U.S. Appl. No. 14/074,945, Notice of Allowance, dated Mar. 11, 2016, 20 pages.

Nolan, P., U.S. Appl. No. 14/074,945, Non-Final Rejection, dated Oct. 9, 2015, 33 pages.

Whalen, M., U.S. Appl. No. 12/043,357, Notice of Allowance, dated Oct. 10, 2013, 15 pages.

Whalen, M., U.S. Appl. No. 12/043,357, Final Rejection, dated Jun. 21, 2013, 20 pages.

Whalen, M., U.S. Appl. No. 12/043,357, Non-Final Rejection, dated Jan. 18, 2013, 22 pages.

Whalen, M., U.S. Appl. No. 12/043,357, Final Rejection, dated Jan. 12, 2012, 25 pages.

Whalen, M., U.S. Appl. No. 12/043,357, Non-Final Rejection, dated Jun. 21, 2011, 21 pages.

Varghese, S., U.S. Appl. No. 12/171,438, Notice of Allowance, dated Nov. 10, 2011, 11 pages.

Varghese, S., U.S. Appl. No. 12/171,438, Non-Final Rejection, dated Apr. 27, 2011, 22 pages.

Nolan, P., U.S. Appl. No. 12/563,577, Notice of Allowance, dated Jul. 9, 2013, 13 pages.

Nolan, P., U.S. Appl. No. 12/536,577, Non-Final Rejection, dated Jan. 18, 2013, 25 pages.

(56) References Cited

OTHER PUBLICATIONS

Nolan, P., U.S. Appl. No. 12/563,577, Non-Final Rejection, dated Jul. 20, 2012, 39 pages.

* cited by examiner

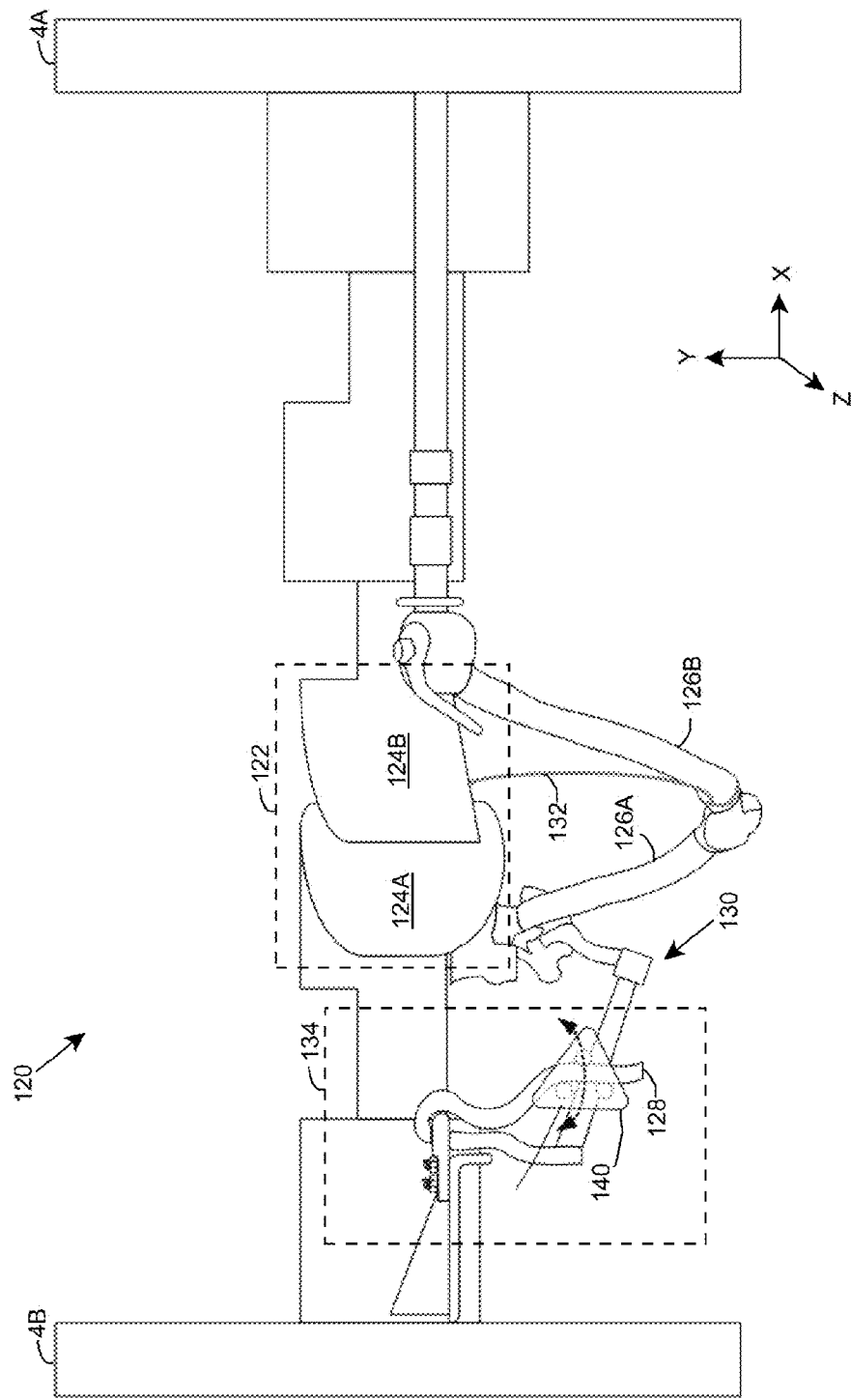

10,471,976 B2

RAILWAY MAINTENANCE DEVICE

REFERENCE TO PRIOR APPLICATIONS

The current application is a continuation application of U.S. Utility patent application Ser. No. 14/074,945, which was filed on 8 Nov. 2013, and which is a continuation application of U.S. Utility patent application Ser. No. 12/563,577, which was filed on 21 Sep. 2009 and issued as U.S. Pat. No. 8,583,313 on 12 Nov. 2013, and which claims the benefit of U.S. Provisional Application No. 61/136,624, which was filed on 19 Sep. 2008, each of which is hereby incorporated by reference. Aspects of the disclosure are related to U.S. Utility patent application Ser. No. 12/043,357, titled "Rail vehicle Identification and processing", which was filed on 6 Mar. 2008, and U.S. Utility patent application Ser. No. 12/171,438, titled "Rail vehicle identification and processing", which was filed on 11 Jul. 2008, each of which is hereby incorporated by reference.

TECHNICAL FIELD

The disclosure relates generally to a robotic system, and more particularly to processing objects, such as rail vehicles, using a robotic system.

BACKGROUND ART

During use, railroad wheels are subjected to high, long-term stresses. Despite being made of high-quality steel, the stresses cause the wheels to become worn over a long period of operation. Without maintenance, a wheel can become too thin or otherwise no longer of the correct geometry. Further, the wheels may develop other defects, such as, for example, a "slid flat" or "flat spot", which is caused by locking the wheels with the brakes in an attempt to stop.

The wheels of railroad cars and locomotives cannot turn differentially since they are affixed to solid axles. As a result, any difference between the shape and/or size of the wheels on either side of a car/locomotive can cause a tendency to turn, leading to an increased possibility of derailment. Therefore, it is important to periodically inspect the wheels on railroad cars and locomotives to ensure that they remain safe to operate, both as an individual wheel and as a pair of wheels on the same axle.

The use of a J-shaped, steel wheel gauge is a common approach to inspecting rail wheels. In this approach, an inspector manually places the gauge on the wheel, ensures contact with all relevant portions of the wheel, reads the measurements from marked scales on the gauge, and manually enters the data. Similarly, an electronic wheel gauge can be used, which performs some of the functions automatically, thereby improving accuracy and reducing the overall time spent measuring the wheels. Various illustrative embodiments of handheld electronic wheel gauges are shown and described in U.S. Pat. No. 4,904,939, U.S. Patent Application Publication No. 2005/0259273, and U.S. Patent Application Publication No. 2007/0075192, each of which is incorporated by reference. In both approaches, the inspection is carried out by hand, on one wheel at a time, on a stationary train. To address this limitation, a number of approaches seek to measure rolling stock wheels while they are in motion, detect various defects through the measurements, and record the associated data in an automated fashion. Various illustrative embodiments of such measurement solutions are shown and described in U.S. Pat. Nos. 5,636,026, 6,768,551, U.S. Pat. No. 6,523,411, and U.S. Patent Application Publication No. 2007/0064244, each of which is incorporated by reference.

Frequently, rail wheels are inspected at a classification yard (e.g., hump yard, flat-shunted yard, gravity yard, and/or the like). For example, an incoming train may be halted while one or more cars are manually inspected. Often, due to time constraints, only a few cars are actually inspected and/or the inspection is only cursory (e.g., visual inspection). Subsequently, the cars on the incoming train are classified and routed to corresponding tracks for inclusion on an outgoing train. The classification is performed based on a destination for each car. Once an outgoing train is assembled, one or more cars may be manually (e.g., visually) inspected along with an inspection of the brakes for the train. Subsequently, the train will leave the classification yard for the next destination.

Most attempts to automate the routing of incoming and outgoing rail vehicles for a train require the installation of automation equipment on the individual rail vehicles. For example, in order to automate the decoupling of two rail vehicles, several approaches seek to install an additional mechanical assembly on the coupler. Another approach provides a sentinel-like structure overhanging a train, which includes a stationary multi-link robotic arm to perform decoupling (e.g., pin-pulling) of rail vehicles. However, this requires that the rail vehicles be stationary and placed in a relatively precise location and that a pin washer be present and recognizable in the coupling in order to successfully decouple the rail vehicles. Additionally, this approach does not provide a solution capable of performing other operations that may be necessary to completely decouple/couple rail vehicles (e.g., disassembly/assembly of brake hose) and/or may be desired (e.g., security, cleaning, inspection, and/or the like).

SUMMARY OF THE INVENTION

The inventors recognize, among other things, a need for a cost effective automated or semi-automated solution that improves and/or provides for various operations relating to the processing of rail vehicles. To this extent, an embodiment provides a robotic vehicle capable of performing routing-related functions of rail vehicles, evaluation of rail vehicles, security, and/or the like, in a rail yard. The robotic vehicle can be configured to: perform operations on moving rail vehicles; receive a set of tasks and execute the tasks without further operator intervention; successfully operate despite variations in object geometry, locations, and field conditions (e.g., snow/rain, cluttered scene, etc.); consume low power while operating; and/or the like.

Aspects of the invention provide a robotic vehicle configured for autonomous or semi-autonomous operation in a rail environment. The vehicle can process image data to move about the rail environment and perform one or more actions in the rail environment. The actions can include one or more actions related to decoupling and/or attaching rail vehicles, and can be implemented by performing three-dimensional image processing. The vehicle can be configured to move with any movement of a rail vehicle on which one or more actions are being performed. In an alternative embodiment, the various components configured to perform the action are implemented at a stationary location with respect to a rail line.

A first aspect of the invention provides a vehicle configured for autonomous operation, the vehicle comprising: a first imaging device configured to acquire location image data; a transport component configured to enable the vehicle to move independently; a processing component configured to process the location image data acquired by the first imaging device and operate the transport component to move the vehicle using the location image data; a set of action components, the set of action components including at least one component configured to be temporarily secured with respect to a target object external to the vehicle; means for moving the at least one component to temporarily secure the at least one component with respect to the target object; and means for enabling the set of action components to move freely with the target object after the at least one component is temporarily secured.

A second aspect of the invention provides a railway maintenance device configured for autonomous operation, the device comprising: a multi-link arm, each link capable of independent movement in at least one direction; a set of visualization components configured to capture work region image data for a region including at least one target object; an action component located on a link of the multi-link arm; and a processing component configured to process the work region image data to generate a three-dimensional representation of the region, move at least one of the links to place the component near a target object in the region using the three-dimensional representation, and operate at least one of the arm or the action component to perform a railway maintenance operation.

A third aspect of the invention provides a rail yard comprising: a railway maintenance device configured for autonomous operation, the device comprising: a multi-link arm, each link capable of independent movement in at least one direction; a set of visualization components configured to capture work region image data for a region including at least one target object; an action component located on a link of the multi-link arm; and a processing component configured to process the work region image data to generate a three-dimensional representation of the region, move at least one of the links to place the component near a target object in the region using the three-dimensional representation, and operate at least one of the arm or the action component to perform a railway maintenance operation, wherein the railway maintenance operation comprises at least one of: decoupling a pair of rail vehicles, detaching a pair of brake hoses, attaching a pair of brake hoses, or acquiring inspection data for a rail vehicle.

A fourth aspect of the invention provides a method of performing an operation on at least one rail vehicle, the method comprising: locating a vehicle adjacent to the at least one rail vehicle using location image data acquired by an imaging device located on the vehicle and a motor turning at least one of a set of wheels on the vehicle; securing at least one component of the vehicle with respect to a target object on the at least one rail vehicle in response to the locating; disengaging the motor from the at least one of the set of wheels using a clutch in response to the securing; and performing the operation on the at least one rail vehicle subsequent to the disengaging.

The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

FIG. 5 shows an illustrative coupling mechanism, which is commonly incorporated to couple rail vehicles, and the operation thereof according to an embodiment.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide a robotic vehicle configured for autonomous or semi-autonomous operation in a rail environment. The vehicle can process image data to move about the rail environment and perform one or more actions in the rail environment. The actions can include one or more actions related to decoupling and/or attaching rail vehicles, and can be implemented by performing three-dimensional image processing. The vehicle can be configured to move with any movement of a rail vehicle on which one or more actions are being performed. In an alternative embodiment, the various components configured to perform the action are implemented at a stationary location with respect to a rail line. As used herein, unless otherwise noted, the term "set" means one or more (i.e., at least one) and the phrase "any solution" means any now known or later developed solution.

An embodiment provides a robotic vehicle capable of fully autonomous and/or semi-autonomous operation for performing one or more rail-related actions including, but not limited to, rail yard maintenance/inspection, hump track maintenance, hazardous material response, perimeter security, and/or the like. Railways are under constant pressures to reduce cost and provide safer operation. It is desirable to reduce the exposure of workers to slipping within a rail yard, the requirement of workers to perform continuous monitoring, the requirement of workers to perform actions in dangerous conditions, etc. Therefore, a railway solution that incorporates a robotic vehicle capable of fully autonomous and/or semi-autonomous operation can be beneficial to the railway industry.

Figure 1:
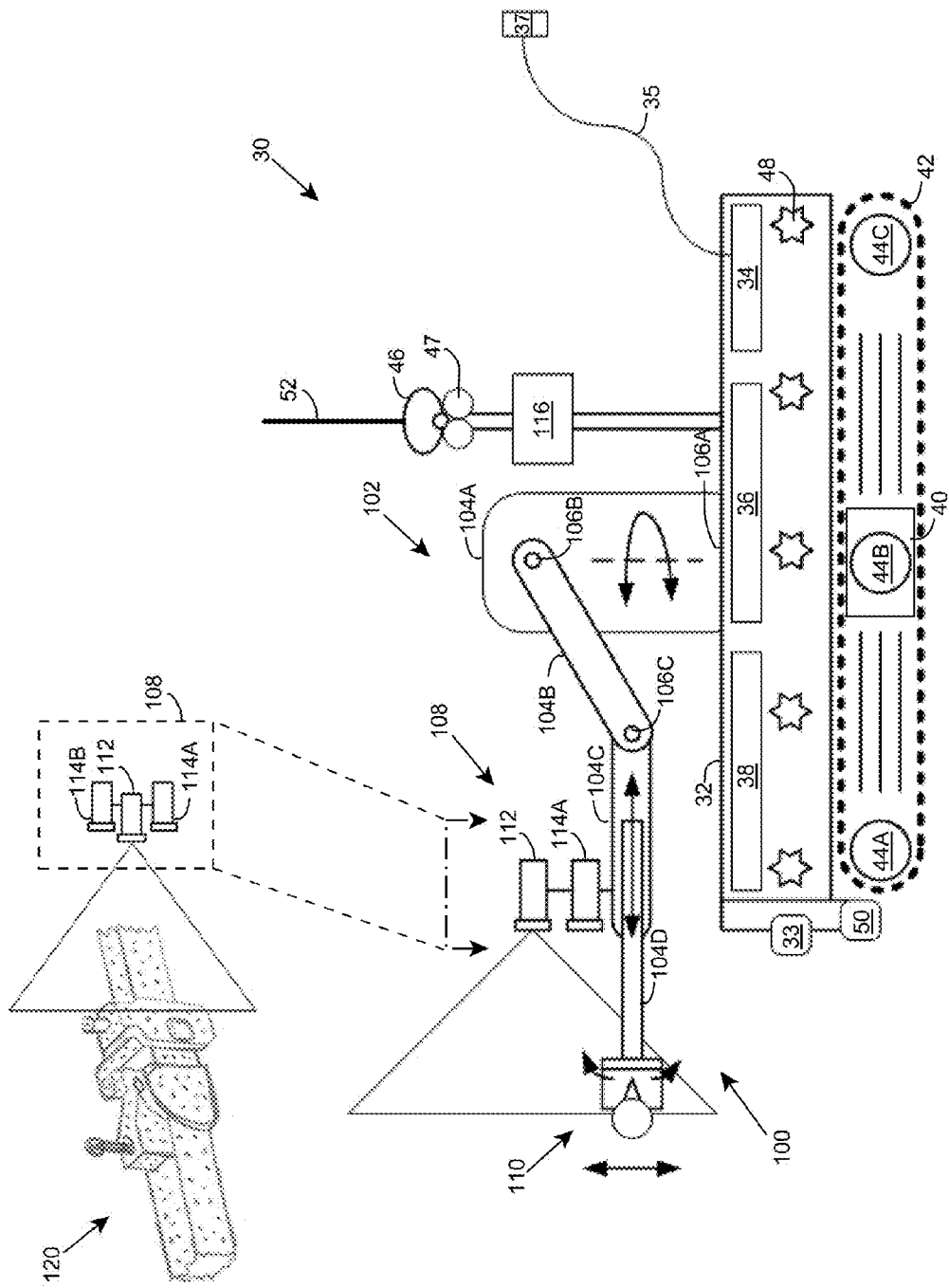
FIG. 1 shows a side view of an illustrative robotic vehicle according to an embodiment.

Turning to the drawings, FIG. 1 shows a side view of an illustrative robotic vehicle 30 according to an embodiment. Vehicle 30 comprises a housing 32, which holds a power component 34, a processing component 36, a positioning component 38, and a transport component 40 therein and can protect the various components 34, 36, 38, 40 from exposure to elements within an operating environment of vehicle 30. It is understood that FIG. 1 includes only schematic representations of components 34, 36, 38, 40 and therefore no relative size or location of the various components 34, 36, 38, 40 should be inferred from FIG. 1. Housing 32 can comprise any type of rugged casing that is designed to withstand the rigors of use in an outdoor environment, such as a rail yard. Additionally, it is understood that the various components 34, 36, 38, 40 can be held in place within housing 32 using any solution, e.g., via bolts. Still further, it is understood that housing 32 can include various additional components, such as an environmental monitoring and/or control component, which are not shown and described herein for clarity.

Power component 34 can comprise a power source, such as a battery, which is capable of providing and distributing sufficient power to operate the various components of vehicle 30 without connection to an external power supply. Power component 34 can comprise a power source selected to provide a desired amount of peak operating power and provide such power for a desired amount of operating time. In this case, vehicle 30 can move freely within its operating environment. In an embodiment, power component 34 comprises a set of lithium polymer batteries capable of providing a peak operating power of approximately 200 Watts for a period of approximately eight hours. Power component 34 can be recharged via a battery charger 33 and/or power cord 35 connected to an external power source 37. In some applications, vehicle 30 can operate while power component 34 acquires power from an external power source 37, e.g., via power cord 35. In this case, the movement of vehicle 30 can be restricted and the length of power cord 35 will need to be sufficiently long to enable vehicle 30 to perform all desired operations. Further, in other applications, power component 34 can acquire power from an external power source 37 using any alternative power mechanism (e.g., a conductor rail, an overhead wire, and/or the like).

As illustrated, vehicle 30 can comprise a tracked vehicle, in which transport component 40 includes a motor that drives a set of tracks 42. In this case, vehicle 30 can move without restriction in an environment susceptible to various adverse travel conditions (e.g., mud, ice, large stone ballast, etc.) and/or including rough terrain (e.g., railroad tracks, steep inclines, etc.). Each track 42 is rotated about a set of wheels 44A-44C, at least one of which (e.g., wheel 44B) is driven by a motor within transport component 40. In an embodiment, the motor comprises a pulse width modulated (PWM) direct current (DC) electrical motor, which will enable vehicle 30 to operate for prolonged durations (e.g., approximately eight hours) without requiring recharging. Further, transport component 40 can include a clutch/transmission, which attaches the motor to the wheel(s). Inclusion of a clutch will allow processing component 36 to disengage the clutch and allow the wheels 44A-44C and tracks 42 to move freely without using transport component 40. A direction of travel for vehicle 30 can be changed by rotating two parallel tracks 42 at different speeds and/or in different directions. In an embodiment, each track 42 comprises a rubber track, however, alternative tracks, such as steel tracks, can be utilized.

Figure 2:
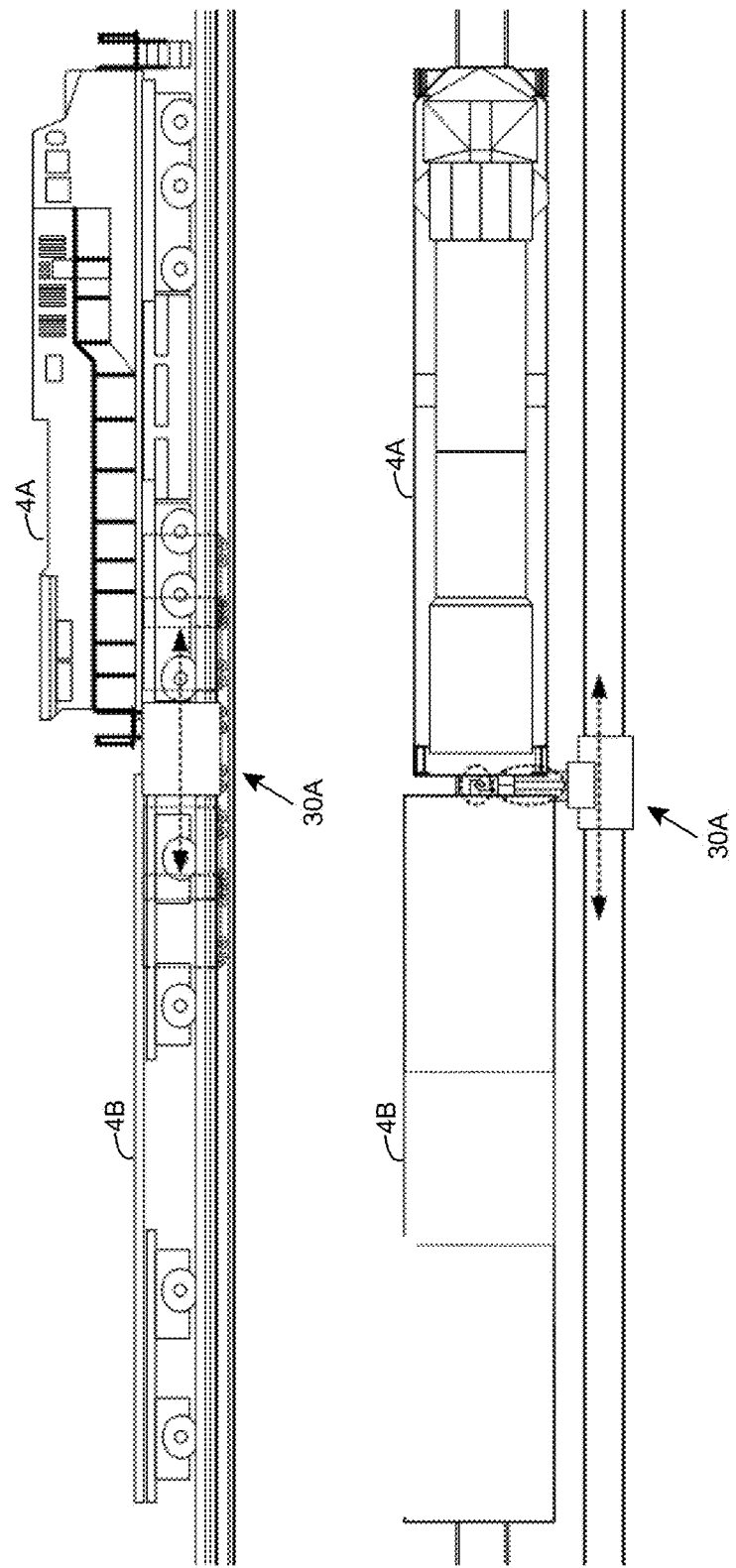
FIG. 2 shows side and top views of an alternative robotic vehicle according to an embodiment.

Additionally, it is understood that for various applications, vehicle 30 can comprise a wheeled vehicle, which can move unrestricted over a terrain, move along a rail, move over pathways, and/or the like. To this extent, FIG. 2 shows side and top views, respectively, of an alternative robotic vehicle 30A, which comprises a rail-based vehicle traveling over a set of rails according to an embodiment. In this case, the set of rails can run parallel to a rail line on which rail vehicles 4A-4B are moving and the set of rails can be situated a sufficient distance from rail vehicles 4A-4B so that vehicle 30A does not interfere with other operations. It is understood that, with the exception of modifications to a portion of transport component 40 (FIG. 1), vehicle 30A can include the same components as shown and described herein with respect to vehicle 30 (FIG. 1).

Returning to FIG. 1, vehicle 30 can include an ability to operate autonomously. To this extent, processing component 36 and/or positioning component 38 can be configured to enable vehicle 30 to identify its location and identify objects within its surrounding area. For example, vehicle 30 can include an omni-directional imaging device 46, such as a low-light 360 degree omni-directional camera. Imaging device 46 can be configured to capture the omni-directional image data using moving parts (e.g., a pan/tilt/zoom imaging device) or no moving parts (e.g., using mirrors or the like to reflect the omni-directional image data onto imaging device 46). Imaging device 46 can comprise a sufficiently high resolution that enables determination of desired details of targets of interest within a desired operating range in the image data to enable a desired level of analysis. The level of detail, operating range, and level of analysis can be selected and vary based on the application in which imaging device 46 is used. In an illustrative embodiment, imaging device comprises a two megapixel imaging device. Imaging device 46 can acquire images of the general surroundings of vehicle 30, which can be provided for processing by processing component 36 to acquire an overall situational awareness for vehicle 30. Similarly, vehicle 30 can include a set of microphones, such as an acoustic microphone array 47, which can acquire acoustic data from the environment around vehicle 30. Processing component 36 can process the acoustic data to detect and compute directional information for a source of a sound, e.g., by comparing phase information from the array 47, identify the type of sound, and/or the like.

Additionally, vehicle 30 can include a set of collision avoidance sensors, such as sensor 48, each of which can be mounted on housing 32. A sensor 48 can comprise any type of sensor, such as an ultrasonic sensor, a laser scanning sensor, and/or the like, which is capable of acquiring sufficient data to enable processing component 36 to detect objects relatively close to vehicle 30. Processing component 36 can process the data acquired by sensor(s) 48 to determine a distance, a relative speed, a relative direction of travel, and/or the like, of the closest objects. The compiled data from the set of sensors 48 can provide a complete distance map and potential trajectory of the nearest objects to the vehicle 30.

Positioning component 38 also can include a geographic location radio signal receiver, such as a global positioning system (GPS) receiver, which can acquire geographic location information for vehicle 30 from a wireless geographic location transmitter, such as a GPS transmitter. In an embodiment, the GPS receiver is further configured to receive a differential GPS (DGPS) signal from a differential GPS correction transmitter, which can be utilized to further refine an accuracy of the GPS-based location. Additionally, positioning component 38 can further include one or more sensors that can provide dead-reckoning data. For example, positioning component 38 can include a three-axis accelerometer sensor, a fiber optic gyro, or the like, which track very slow movements, a distance sensor, e.g., an inertial navigation unit, and/or the like. Processing component 36 and/or positioning component 38 can augment the DGPS or GPS-derived location information with the dead-reckoning data acquired by the set of sensors to further enhance an accuracy of the location information. Further, positioning component 38 can acquire movement data from a laser or microwave-based true ground speed sensor 50, or the like, which processing component 36 and/or positioning component 38 also can utilize to further enhance an accuracy of the location information.

It is understood that while DGPS and GPS signals are discussed herein, any type of geographic location signals, such as LORAN (Long Range Navigation), GLONASS (Global Navigation Satellite System), and/or the like, can be utilized. Similarly, an embodiment of positioning component 38 can receive signals from a set of beacons to derive location information using triangulation. Alternatively, positioning component 38 can derive the location information from an intersection point for a set of vectors derived from the relative field strength, time of arrival (TOA), time difference of arrival (TDOA), phase difference between signals, and/or the like. It is understood that various types of beacons, such as ultra-wideband location beacons, cell phone towers, pager towers, distance measuring equipment (DME), VHF Omni-directional Radio Range (VOR), LORAN, and/or the like can be utilized.

In addition to geographic location information, processing component 36 can send data to and receive data from other systems that are remote from vehicle 30. To this extent, vehicle 30 can include an antenna 52, such as a radio frequency (RF) antenna, to send and receive data via a wireless communications solution. In an embodiment, vehicle 30 sends/receives data to/from other systems using antenna 52 via a wireless fidelity (Wi-Fi) link under the 802.11b protocol and a secure link that is not susceptible to jamming or other interference. However, it is understood that other types of wireless communications links, operating frequencies, communications protocols, and/or the like, can be used including, but not limited to, a microwave link, an infrared link, 802.11g, TCP/IP protocol, and/or the like.

Regardless, an embodiment of the wireless communications solution enables multiple vehicles 30 to operate within an area and communicate with the same system(s) without the communications conflicting. To this extent, a group of vehicles 30 can be implemented within a work area, and cooperatively address various maintenance-related, dangerous, and/or routine tasks for the work area. For example, multiple vehicles 30 can be deployed in a rail yard to perform inspections, monitor the area, decouple rail vehicles, and/or the like. The vehicles 30 can be configured to communicate with a central system and/or with one another to request assistance or perform some action, when necessary.

Processing component 36 can be selected and configured to perform processing related to the corresponding application for vehicle 30. In an embodiment, processing component 36 comprises a distributed, low power, processing engine. Regardless, processing component 36 can be configured to process machine vision-related algorithms to enable vehicle 30 to move about an environment without communicating with an external system, which enables a reduction in an amount of bandwidth required and enables real time processing to be performed by vehicle 30.

Figure 3:
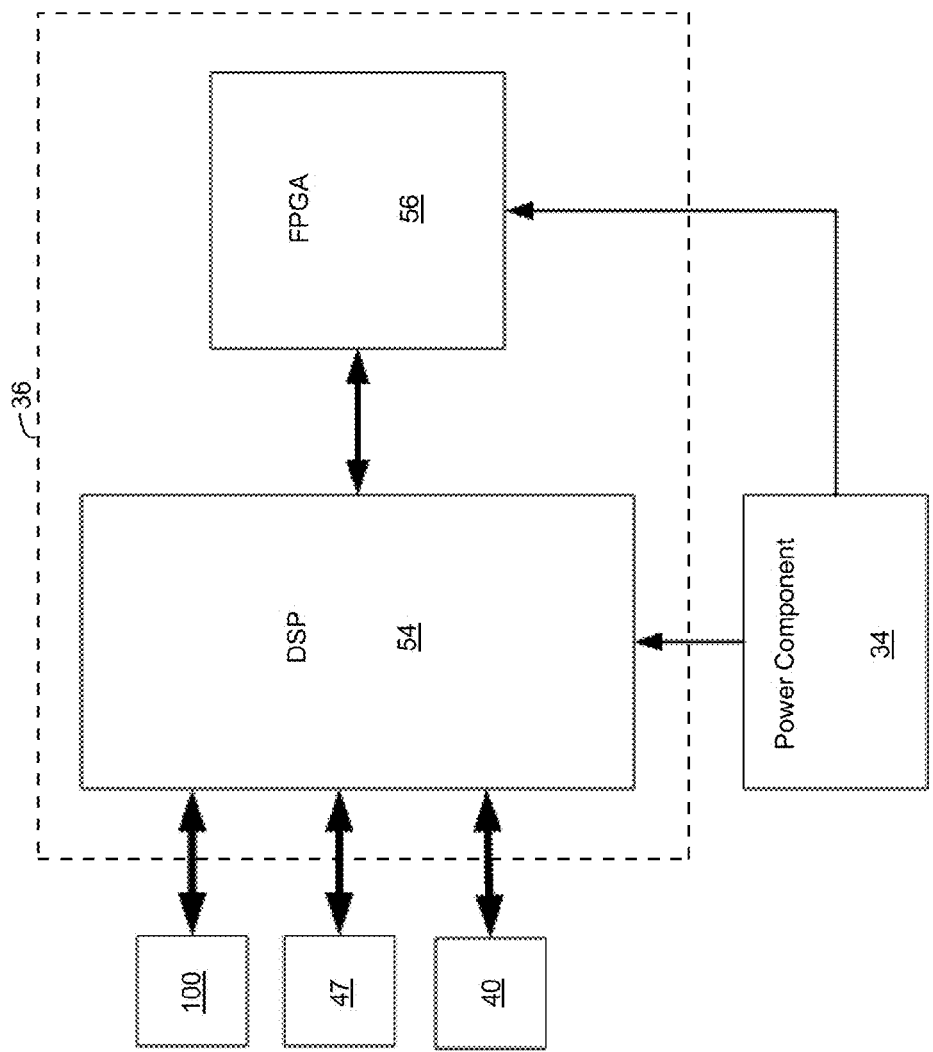
FIG. 3 shows a schematic diagram of an illustrative processing component for a robotic vehicle according to an embodiment.

FIG. 3 shows a schematic diagram of an illustrative processing component 36 for a robotic vehicle, such as robotic vehicle 30 (FIG. 1), according to an embodiment. Processing component 36 can be configured to operate while consuming a low amount of power to enable extended operation of a vehicle 30 comprising an on board power source, such as a battery. For example, processing component 36 can consume a few watts (e.g., approximately ten watts) of power at full processing. In an embodiment, processing component 36 comprises a processing component as shown and described in U.S. patent application Ser. No. 11/869,981, which was filed on 10 Oct. 2007, and which is hereby incorporated by reference. To this extent, processing component 36 is shown including a low power digital signal processor (DSP) 54 and an on-board field programmable gate array (FPGA) 56. DSP 54 can comprise, for example, a current state of the art DSP 54, such as DM642 from Texas Instruments. FPGA 56 can comprise, for example, a Virtex series FPGA from Xilinx, Inc. In this case, by utilizing FPGA 56 to perform repetitive computations, the processing component 36 can compute at a rate of 500 million instructions per second (MIPS) while consuming only a total of approximately five watts.

Processing component 36 can operate the various interface components, such as the motor 40 for moving vehicle 30, the microphone array 47, and/or various application-specific components 100, in a manner that enables additional power savings. For example, processing component 36 can power down components that are not actively performing any processing. Similarly, some or all of processing component 36 can be powered down when not actively being used for processing.

Robotic vehicle 30 comprises an arm 102, which includes a plurality of links 104A-104D, each of which can be moved independent of the other links 104A-104D. As illustrated, link 104A can rotate around a vertical axis extending from an attachment point 106A. Links 104B, 104C are rotatable about attachment points 106B, 106C, respectively, and link 104D can be extended from/retracted into link 104C. The rotation of links 104A-104C about attachment points 106A-106C, respectively, can be implemented using, for example, a harmonic drive located at each attachment point 106A-106C, each of which can be independently controlled by processing component 36. Link 104D can be extended/retracted using, for example, a linear actuator located within link 104C and attached to link 104D, which also can be independently controlled by processing component 36. Similar to one or more of the attachment points 106A-106D can be configured to enable processing component 36 to disengage the corresponding device used to move the link 104A-104D to enable the link 104A-104D to move freely (e.g., due to the movement of another object). However, it is understood that harmonic drives and a linear actuator are only illustrative of various devices that can be utilized. To this extent, in other embodiments, the use of the harmonic drives and linear actuator are interchanged and/or alternative devices, such as servo motors, stepper motors, muscle wire, feedback encoders, electronic motor drives, feedback torque sensors, etc., can be used to move the various links 104A-104D. While vehicle 30 is shown including a single arm 102, it is understood that vehicle 30 can include any number of arms 102.

Vehicle 30 can include a set of components that are utilized for performing various operations. To this extent, link 104C is shown including a set of visualization components 108 and link 104D is shown including a set of action components 110. In an embodiment, the set of visualization components 108 includes a light source 112 and a set of imaging devices 114A, 114B. In a more particular embodiment, light source 112 can comprise a source of a type of diffused light, which can enable the set of imaging devices 114A, 114B to capture image data that is capable of being processed using two-dimensional machine vision techniques, such as image segmentation, thresholding, pattern recognition, or the like, to locate one or more objects within the field of view. In this case, a single imaging device can be utilized to capture the image data. In an illustrative embodiment, imaging devices 114A, 114B each comprise a resolution of approximately two megapixels. It is understood that various alternative configurations of the set of visualization components 108 can be implemented depending on the required imaging and/or the operating environment. For example, the set of imaging devices can include one or more imaging devices that capture color, infrared, multi-spectral, and other types of image data.

The set of action components 110 can be selected and configured to perform any combination of various actions including, but not limited to, inspection of an object (e.g., using an imaging device, one or more sensors such as infrared sensors, chemical sensors, etc.), repair/repair assistance, coupling/decoupling, and/or other types of manipulations of objects. The set of action components 110 can be operated and controlled by processing component 36 and/or can be operated under the direction of one or more remote users.

To this extent, vehicle 30 can be configured to perform operations that require a highly precise machine vision system to locate object(s) that are to be manipulated using the set of action components 110 in various outdoor operating environments. In this case, a two-dimensional machine vision system can be fooled by, for example, falling snow partially covering a part, plain scene clutter with too many similar looking objects, many variations in two-dimensional shapes, other objects which appear similar when viewed in a two-dimensional plane, and/or the like. In an alternative more particular embodiment, the set of visualization components 108 can include a pair of imaging devices 114A, 114B, which capture image data that can be used to create a stereo image, e.g., an image including a three-dimensional set of coordinates, of an object on which vehicle 30 is configured to perform one or more manipulations. In still another alternative more particular embodiment, the set of visualization components 108 can include a light source 112 that emits a pattern of light, such as a sheet (e.g., line) of light, and one or more imaging devices 114A, 114B that capture images of an area as the light reflects off of different surfaces within the area. Light source 112 can be configured to move the pattern of light across the area, or light source 112 can be moved with respect to the area. In any event, processing component 36 can process the multiple images to generate a complete profile for the object(s) within the field of view, e.g., by reconstructing structural information from motion (SFM), shape from shadows, and/or the like. For example, processing component 36 can use arm 102 to capture multiple images of an object for which three-dimensional information is desired. Processing component 36 can use image geometry and the multiple images to compute the three-dimensional information. It is understood that while only a single light source 112 is shown, vehicle 30 can include any combination of two or more light sources 112. For example, light source 112 can comprise a large number of light emitting diodes (LEDs) with a diffuser plate in front of the LED array. Further, additional light sources 112 can be mounted around imaging devices 114A, 114b to reduce shadows on the object(s) within the field of view caused by the illuminated light.

In order for vehicle 30 to perform a task on a object whose three-dimensional coordinates are known, processing component 36 can plan movement of links 104A-104D in a manner that ensures the links 104A-104D travel in a direction that moves closer to the object without spending time searching the three dimensional travel space. In an embodiment, processing component 36 implements an inverse kinematics-based solution to position the links 104A-104D with respect to a target object. Inverse kinematics comprise a class of computer solutions that can plan the path for the links 104A-104D given a destination for the links 104A-104D. Processing component 36 can use linear equations, Jacobian models, and optimized 3D space searches to quickly calculate an optimal path for the links 104A-104D until the links 104A-104D arrive at a desired location with respect to the object.

Vehicle 30 can be configured to capture data that enables processing component 36 to attempt to uniquely identify one or more objects, such as rail vehicles. To this extent, imaging devices 114A, 114B and/or imaging device 46 can capture image data of a unique identifier, such as a license plate, a vehicle number, object attributes (e.g., color, construction, etc.), and/or the like. Processing component 36 can process the image data, e.g., using optical character recognition (OCR) software, pattern recognition software, or the like, to determine a unique identifier for the vehicle. Additionally, vehicle 30 can include a wireless identification device 116, such as a radio frequency identification (RFID) tag reader, which can acquire, when available, identification data transmitted by a corresponding wireless identification transmitter placed in conjunction with an object.

In an illustrative application, which is used to describe aspects of the invention herein, a classification yard includes a system for evaluating and/or performing routine maintenance on rolling stock in each of many consists (e.g., one or more connected rail vehicles) of rolling stock using vehicle 30. The system can route any rolling stock that is evaluated as including one or more designated defects to a maintenance area, which can address the defect(s) before allowing the rolling stock to be included on a train that is sent out to various destinations for delivery. In this manner, the system can improve: safety by reducing a likelihood of an accident in which one or more of the defects is a contributing cause; efficiency by removing defects that can lead to increased energy expenditure during operation; and/or the like.

Robotic vehicle 30 can be implemented within the classification yard, e.g., as part of the evaluation and/or maintenance system, and be configured to perform one or more operations that are typically manually implemented in conjunction with maintenance and/or routing rail vehicles in the classification yard. For example, an illustrative robotic vehicle can be configured to operate a coupler release handle, disconnect/reconnect railway brake hoses, and/or the like, between two connected rail vehicles to decouple/attach the rail vehicles. In this manner, it is not necessary for any personnel to get between two rail vehicles to detach/attach the rail vehicles from/to one another thereby improving the safety and efficiency of processing the rail vehicles within the classification yard.

Figure 4:
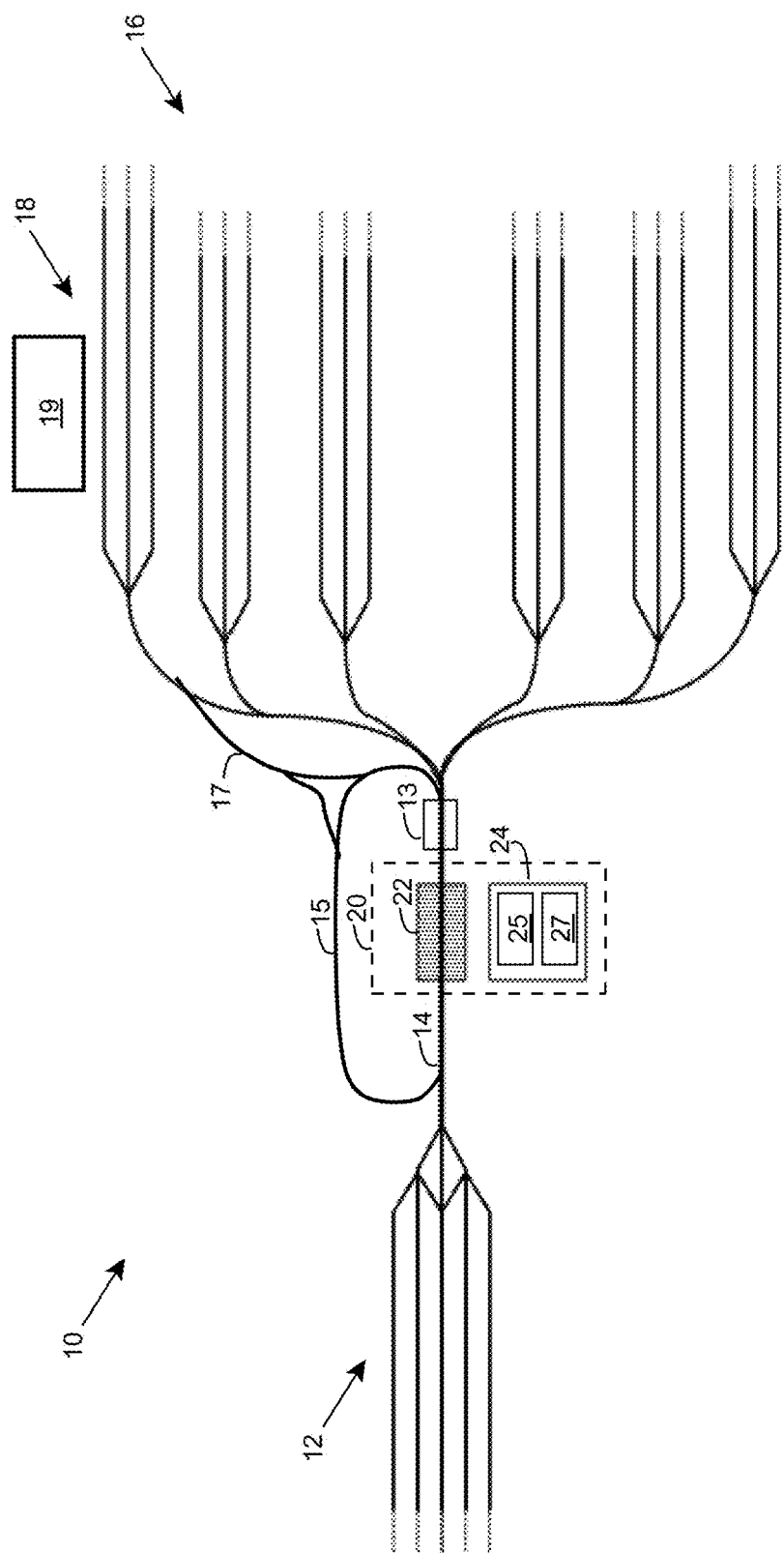
FIG. 4 shows an illustrative simplified diagram of a classification yard according to an embodiment.

FIG. 4 shows an illustrative simplified diagram of a classification yard 10 according to an embodiment. Classification yard 10 includes a number of consist assembly tracks 12 that feed into a single rail line 14. All rail traffic passing through classification yard 10, apart from through traffic, passes along rail line 14. Rail line 14 then diverges into multiple outbound tracks 16. Rolling stock evaluated as having defect(s) that require service is/are routed to a dedicated set of maintenance tracks 18. Additionally, freight traffic classification can occur within classification yard 10. During the classification of freight traffic, freight-carrying rail vehicles that do not require servicing are decoupled according to the destinations and routed to one of the various outbound tracks 16 in classification yard 10 for re-coupling with other rail vehicles as part of an outbound train. Rail line 14 includes a set of retarder devices 13, which are configured to reduce the speed of rail vehicles passing thereby.

Classification yard 10 includes a processing system 20, which can evaluate the rolling stock for the presence of one or more defects and route the rolling stock based on the defect(s) and/or its destination using vehicle 30 (FIG. 1). To this extent, processing system 20 is shown including an evaluation component 22 that automatically acquires measurement data and evaluates various aspects of the rolling stock as it travels along rail line 14. Evaluation component 22 can provide measurement and/or evaluation data to a management component 24, which can route the rolling stock accordingly. Management component 24 can include a computer system that aids in routing the rolling stock (e.g., by designating a track, operating switches to route the rolling stock to the track, and/or the like). To this extent, management component 24 can comprise a routing component 25, which provides for the routing of rail vehicles through classification yard 10, and an inspection component 27, which implements the inspection actions described herein. Routing component 25 and inspection component 27 can interact with one another and one or more vehicles 30 to process vehicles through classification yard 10. A user can be located in a control tower or the like, which can assist the user in overseeing the operations of classification yard 10 while utilizing management component 24 in moving rolling stock through classification yard 10. In this manner, classification yard 10 permits a real-time assignment of good order or bad order evaluation to all passing rolling stock, which further enables more efficient processing of the rolling stock through classification yard 10.

Any combination of various components of rail vehicles can be inspected using evaluation component 22 and/or inspection component 27. For example, evaluation component 22 can acquire measurement data for performing an inspection of the various couplings between two connected rail vehicles, which can be provided for processing by inspection component 27. When inspection component 27 determines that a rail vehicle does not pass the inspection (e.g., includes one or more defects), processing system 20 can determine whether the defect(s) is (are) of the type that can be repaired locally (e.g., in-situ or on a local track).

Diverting a vehicle from a consist to another track, e.g., due to the presence of one or more defects, requires that the vehicle be detached from the other vehicles in the consist. However, a local repair can include a repair of one or more minor defects (e.g., reattachment of a brake line) with the couplings between two rail vehicles. Vehicle 30 can be directed to travel to a location between two rail vehicles and detach/attach various connectors (coupling mechanisms, brake hoses, etc.) when assembling or disassembling a consist, performing a repair, detaching a bad-ordered vehicle, and/or the like. These tasks are inherently dangerous, as they previously required that a worker get between two vehicles in a consist, which may be moving constantly, or suddenly stop or start without warning in classification yard 10. Even a very small movement by a 300,000 pound rail vehicle can be potentially lethal for a worker between two vehicles at that moment.

Vehicle 30 can be configured to attempt to fix minor defects such as loose/hanging equipment (e.g., a hose) or material, over-height/over-width loads, and/or the like, in an automated or semi-automated manner without re-routing the rail vehicle and/or detaching and routing the vehicle locally, e.g., via a loop-back rail line 15. In this case, one or more personnel can direct and/or assist vehicle 30 in performing the repair, and indicate to processing system 20 one or more details of the repair (e.g., time, materials, etc.) as well as whether the repair was successful or not. If the repair is successful, processing system 20 can route the rail vehicle for re-inspection, e.g., via a loop-back rail line 15.

When processing system 20 determines that one or more defects on a vehicle cannot be performed in-situ or that one or more repairs were unsuccessful, the vehicle can be detached from a consist using vehicle 30 and processing system 20 can route the vehicle to one of a set of maintenance tracks 18. Processing system 20 can route the vehicle to the maintenance track 18 via rail line 14 or via rail line 17, e.g., when a repair was first attempted on loop-back rail line 15. In any event, one or more maintenance personnel at a maintenance shop 19 can perform the repair, and indicate to processing system 20 one or more details of the repair (e.g., time, materials, etc.). Subsequently, processing system 20 can route the rail vehicle for re-inspection, e.g., via rail lines 15, 17.

As discussed herein, processing system 20 can utilize a set of robotic vehicles to perform one or more operations required to process the rail vehicles as they pass through classification yard 10. To this extent, referring to FIGS. 1 and 4, robotic vehicle 30 includes a set of application-specific components 100 that enable robotic vehicle 30 to perform various operations required within classification yard 10. In an illustrative application described further herein, robotic vehicle 30 is configured to operate a coupler release handle for decoupling two rail vehicles, disconnect/reconnect railway brake hoses, identify, evaluate, and/or repair the rail vehicles, operate external systems, and/or the like.

In any event, processing component 36 can interact with one or more external systems, such as management component 24, to receive operating instructions corresponding to a consist being processed through classification yard 10 and/or obtain assistance. For example, management component 24 can identify the particular couplings in a consist of rail vehicles that require decoupling. In an embodiment, processing component 36 can receive a set of instructions for a consist as it approaches, and can receive updates to the instructions in response to evaluations performed on the various rail vehicles. For example, the initial set of instructions can indicate the various locations at which the consist must be decoupled according to the corresponding destinations for the rail vehicles, while the updated instructions can indicate a rail vehicle that must be decoupled in order to further evaluate and/or perform maintenance on the vehicle before it is moved through the classification yard 10. The instructions can uniquely identify the coupling to be decoupled using any solution, e.g., based on a location of vehicle 30, location of coupling within the consist, identification of front rail vehicle, and/or the like.

Processing component 36 can communicate the status of completion of one or more of the assigned tasks with an external system, such as management component 24. For example, when two rail vehicles are successfully decoupled, processing component 36 can send an indication to management component 24, which can perform the routing accordingly. When an error occurs, such as an object is detected within an unsafe operation perimeter of vehicle 30, a rail vehicle cannot be identified (e.g., due to a missing RFID tag, smeared or covered vehicle, number, or the like), processing component 36 can send data to and request assistance from an external system, such as management component 24. For example, processing component 24 can transmit image data corresponding to the detected object or unidentifiable vehicle 30, which can be evaluated by personnel to resolve the error (e.g., identify the vehicle) and/or determine further actions to be performed by vehicle 30.

When vehicle 30 is unable to complete a task independently, such as decoupling two rail vehicles, vehicle 30 can obtain assistance from an external source. For example, when processing component 36 cannot locate an object, such as a coupler release handle or brake hoses, processing component 36 can provide image data corresponding to an area in which the object should be present for evaluation by an individual. Further, processing component 36 can request assistance for a particular task when a task cannot be performed within a predetermined amount of time. Still further, processing component 36 can control one or more retarder devices 13 to slow rail vehicles passing thereby, e.g., in order to reduce the tension between two rail vehicles to allow them to separate. In an embodiment, vehicle 30 transmits RF signals directly to the set of retarder devices 13. Alternatively, processing component 36 can signal an external system, such as management component 24, which in turn operates the set of retarder devices 13 accordingly.

As discussed herein, the set of action components 110 can be configured to manipulate one or more objects, such as in decoupling a pair of rail vehicles. To this extent, the set of action components 110 can be configured to operate a coupler release handle, which can be located on one or both sides of the coupler mechanism of a rail vehicle. When operation of the coupler release handle on one side of the rail vehicle fails, the coupler release handle located on the other side of the rail vehicle can be utilized.

Regardless, once vehicle 30 is located adjacent to a work region, e.g., adjacent to the region between a pair of rail vehicles to be decoupled, processing component 36 can acquire image data from imaging devices 114A, 114B and process the image data to locate an object to be manipulated, such as the coupler release handle, and operate the set of action components 110 to perform the manipulation. The set of imaging devices 114A, 114B provide a detailed view of a particular object to be manipulated, which enables processing component 36 to implement machine vision-related processes locally and perform refined object recognition.

FIG. 5 shows an illustrative coupling mechanism 120, which is commonly incorporated to couple rail vehicles 4A, 4B, according to an embodiment. Rail vehicles 4A, 4B are connected at two points: a main coupler assembly 122 and the brake hoses 126A, 126B. In particular, coupler assembly 122 automatically engages when a forward component 124A of a rail vehicle 4B encounters a rear component 124B of another rail vehicle 4A. While coupling mechanism 120 provides for automatic coupling (although brake hoses 126A, 126B are coupled manually), decoupling continues to be performed manually, which can be dangerous. In particular, a human must go between rail vehicles 4A, 4B, which can be moving and/or move at any time, to perform the decoupling. In fact, the decoupling often relies on the movement of one of the rail vehicles 4A, 4B once coupler assembly 122 has been decoupled (e.g., due to gravity when rail vehicles 4A, 4B are on an incline, such as at a classification yard).

To decouple rail vehicles 4A, 4B, a coupler release handle 128 is moved a relatively small amount in a direction perpendicular to the handle's axis to operate a coupler release mechanism 130. That is, release handle 128 is moved vertically when release handle 128 extends horizontally or horizontally when release handle 128 is substantially vertical in orientation, as shown. Operation of release handle 128 in this manner causes coupler release mechanism 130 to release the components 124A, 124B of coupler assembly 122. An operator will determine whether rail vehicles 4A, 4B have separated, and if not, may need to operate release handle 128 again. Brake hoses 126A, 126B are generally connected to a corresponding portion of coupler assembly 122 by a wire or chain harness 132. As rail vehicles 4A, 4B separate, harness 132 exerts angular force upon the brake hose connection, causing the brake hoses 126A, 126B to separate. It is understood that coupling mechanism 120 can include mirrored components of release handle 128 and brake hoses 126A, 126B on an opposite side, which are not shown for clarity.

Referring to FIGS. 1 and 5, the set of imaging devices 114A, 114B can acquire image data having a field of view approximately of that shown in FIG. 5. Processing component 36 can identify certain features/objects within the field of view and locate a bounding area 134 within which coupler release handle 128 should be located. For example, processing component 36 can identify the start of rail vehicle 4B, ground level, and the closest side of vehicle 4B to vehicle 30. Processing component 36 can define the bounding area 134 as a cube having an X-axis that starts one foot in front of vehicle 4B and ends two feet in front of vehicle 4B, a Y-axis that starts one foot above ground level and ends two and a half feet above ground level, and a Z-axis that extends from one foot beyond the vehicle 30 to a half foot beyond the closest side of vehicle 4B. Subsequently, processing component 36 can process image data corresponding to the bounding area 134 to recognize coupler release handle 128, which can be a lever, a hook, an inverted "C" lever, and//or the like.

Processing component 36 can apply a set of three-dimensional machine vision algorithms to the image data to generate a representation of the geometry of various objects within the field of view in three dimensions. For example, processing component 36 can identify various three-dimensional data points by evaluating the stereoscopic image data acquired by imaging devices 114A, 114B, e.g., using the disparity between the image data captured by the two imaging devices 114A, 114B. Similarly, processing component 36 can identify the three-dimensional points by analyzing a set of images acquired with a pattern of light (e.g., moire light pattern, binary light pattern, and/or the like) reflecting off of the various surfaces within the field of view, and/or the like. It is understood that numerous other types of three-dimensional machine vision processing solutions can be implemented on vehicle 30, such as a 3D profile scanner from Keyence, an LMI laser, a Sick laser scanner, a three-dimensional range camera, light detection and radar (LIDAR), scanning sheet of light systems, and/or the like, to generate a 3D representation including three-dimensional data points. An alternative 3D representation can use Voxels, e.g., small triangles that represent a 3D rendering of an object from 3D data points.

Once a 3D representation is available, processing component 36 can process the data points to identify the various objects. In an embodiment, processing component 36 uses in-variant features representing the objects to match against the 3D points. For example, a circular "donut like" object can be described by a set of radii and thickness of the donut. In an illustrative approach, processing component 36 can fit the acquired 3D data points through a curve fitting algorithm to determine whether a match against a previously stored in-variant template occurs. In another approach, processing component 36 can use more general purpose 3D volume fitting algorithms, e.g. Open Source Visualization Toolkit (VTK), or the like, to recognize the object(s). It should be noted that with abundant processing power currently available, 3D volume fitting and template matching has become a practical approach. Determination and evaluation of the three-dimensional points provide improved object recognition when work piece surface conditions, work piece color, and/or the like, can vary substantially, as occurs in outdoor railway conditions where rust is frequently present. Regardless, it is understood that processing component 36 can analyze other features of the object, such as color, texture, approximate location, etc., in addition to its shape to accurately identify the object. Further, it is understood that processing component 36 can identify the various objects by being trained to recognize certain stored patterns, shapes, parts, etc. For example, the VOLTS-IQ visual intelligence software suite, offered by Braintech, comprises an approach to train processing component 36 to identify parts and shapes for later recall and usage.

Figure 6A:
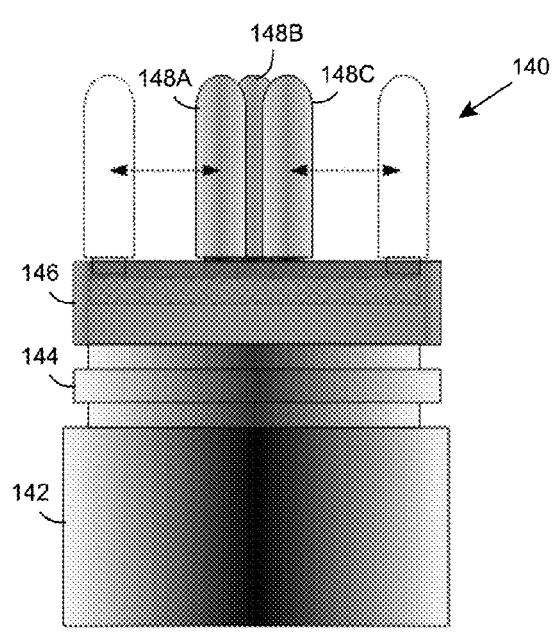
FIGS. 6A-6D show operation of an illustrative manipulator according to an embodiment.
Figure 6C:
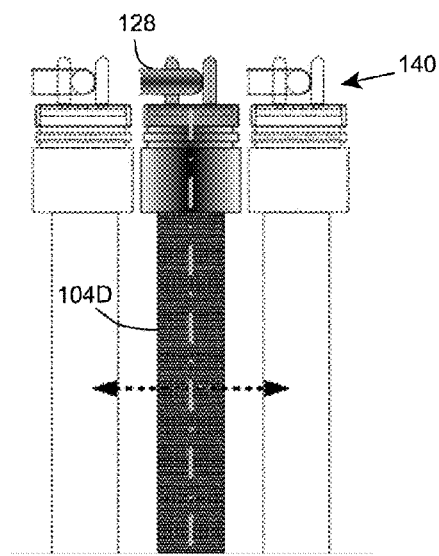
Figure 6B:
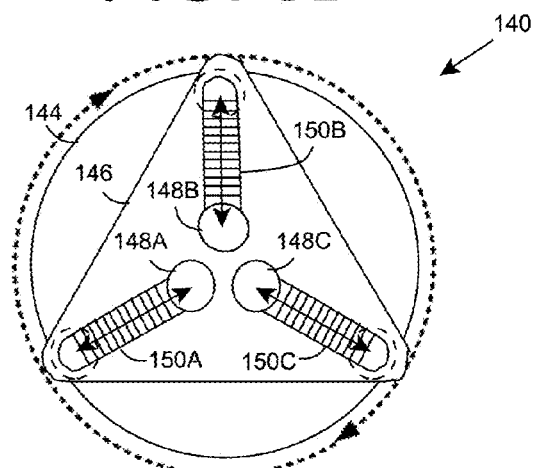

Once identified, processing component 36 can operate one or more components in the set of action components 110 to move coupler release handle 128 to decouple vehicles 4A, 4B. To this extent, FIGS. 6A-6D show operation of an illustrative manipulator 140, which can be located at an end of link 104D (FIG. 1), according to an embodiment. FIGS. 6A, 6B show a front view and top view, respectively, of manipulator 140. Manipulator 140 includes a manipulator attachment 142, a rotation mechanism 144, a gripping mechanism 146, and a plurality of fingers 148A-148C. Each finger 148A-148C can be equipped with a set of sensors, which can, for example, provide information on an amount of force being exerted on the finger 148A-148C. The set of sensors can include, for example, tactile sensor(s), pressure sensor(s), force sensor(s), torque sensor(s), and/or the like. Gripping mechanism 146 includes a plurality of tracks 150A-C along which fingers 148A-C can move. Further, rotation mechanism 144 can enable gripping mechanism 146 and fingers 148A-C to be rotated about its axis. Still further, as illustrated in FIG. 6C, manipulator 140 can be attached to link 104D, which can provide horizontal and/or vertical movement of manipulator 140. It is understood that the various movements described herein can be implemented using any combination of one or more types of motion control components including, but not limited to, servo motors, stepper motors, muscle wire, harmonic drives, feedback encoders, electronic motor drives, feedback torque sensors, and/or the like.

Figure 6D:
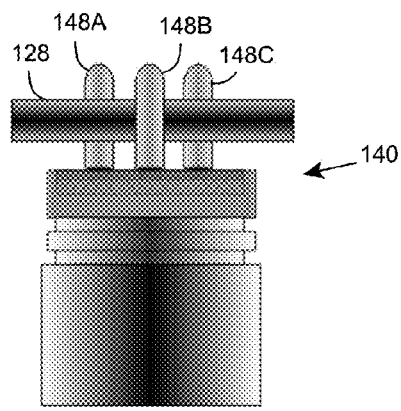

FIGS. 5, 6C, 6D illustrate use of manipulator 140 to operate release handle 128 in order to detach rail vehicles 4A-B. In particular, processing component 36 (FIG. 1) can operate arm 102 (FIG. 1) and/or manipulator 140 to engage release handle 128. To this extent, release handle 128 can be positioned such that multiple fingers, such as fingers 148A, 148C are on one side of release handle 128, while at least one finger, such as finger 148B is on the other side of release handle 128. Processing component 36 can determine that fingers 148A-148C are properly aligned using, for example, data acquired from a sensor on each finger 148A-148C that measures an amount of force being exerted. Once manipulator 140 is engaged, processing component 36 can operate arm 102 to move (e.g., shake) manipulator 140 in the direction/distance required to release components 124A, 124B. Processing component 36 can determine whether rail vehicles 4A, 4B have been successfully released from one another. If so, fingers 148A-148C can disengage from release handle 128. Otherwise, processing component 36 can move manipulator 140 again to seek to release components 124A, 124B.

During operation of release handle 128, processing component 36 can use data from the force sensors on fingers 148A-148C to determine, for example, whether any unusual/abnormal resistance or lack of resistance occurs while the release handle 128 is being moved. Further, processing component 36 can determine various other faults using any solution. For example, processing component 36 can determine a fault due to a failure to release rail vehicles 4A, 4B after a predetermined number of tries, a broken (e.g., stuck or missing) component in coupling mechanism 120, and/or the like. In this case, processing component 36 can generate an alarm, which can be presented to a user for action.

Processing component 36 can determine whether rail vehicles 4A, 4B have been successfully released using any solution. For example, processing component 36 can process image data captured by one or more imaging devices 46, 114A, 114B to determine whether the rail vehicles 4A, 4B are moving away from one another, e.g., whether the distance between the vehicles 4A, 4B is increasing. In another embodiment, vehicle 30 can include a laser distance sensor, or the like, which processing component 36 can operate to point at one or both vehicles 4A, 4B and measure the distance to determine whether the decoupling was successful. Regardless, once a successful decoupling operation is performed, processing component 30 can transmit its success to another system, such as management component 24 (FIG. 4), and wait for instructions or commence its next action.

Returning to FIG. 1, it is understood that processing component 36 can utilize the same or similar processes in order to identify various other types of objects for other applications, and that the set of action components 110 can be configured to perform various other types of actions on these objects for other applications. To this extent, the set of action components 110 can comprise one or more additional components and/or alternative components. Further, as discussed herein, vehicle 30 can comprise multiple arms 102, each having a different set of action components 110.

Within the railroad environment, processing component 36 can identify brake hoses 126A, 126B (FIG. 5) for subsequent connection or separation using a three-dimensional machine vision solution discussed herein. In an embodiment, since brake hoses 126A, 126B must meet dimensional tolerances specified by the Association of American Railways (AAR), vehicle 30 can be configured to use active machine vision metrology, such as imaging reflections of a sheet of light generated by light source 112, to identify the brake hoses 126A, 126B from other background objects by gauging the dimensions of the brake hoses 126A, 126B. In this case, the set of action components 110 can comprise a manipulator configured to decouple railway brake hoses 126A, 126B.

Figure 7A:
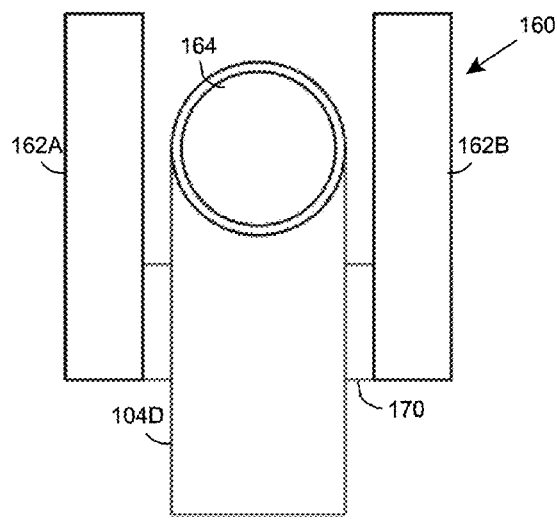
FIGS. 7A-7D show operation of another illustrative manipulator according to an embodiment.
Figure 7C:
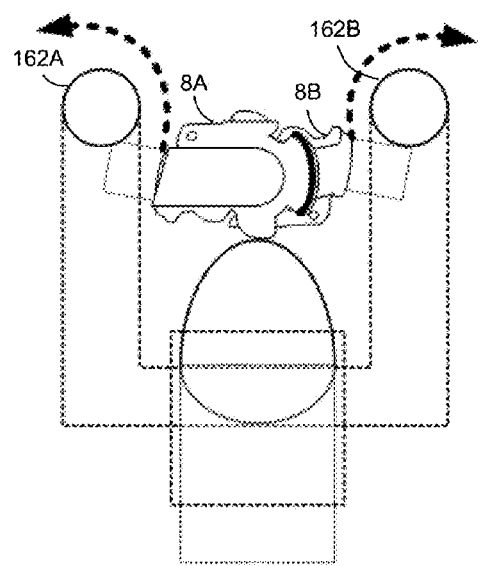
Figure 7B:
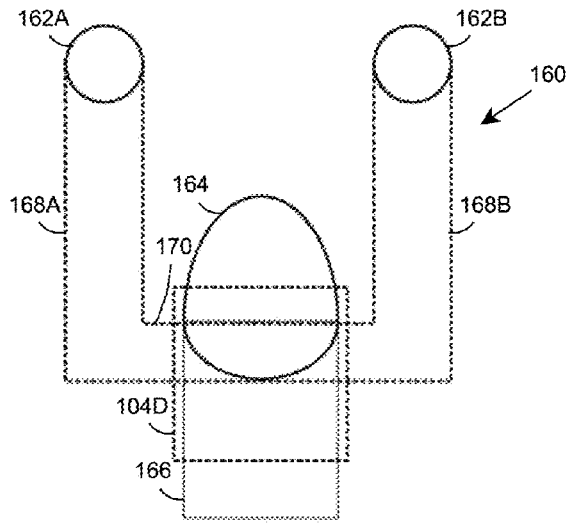

FIGS. 7A-7D show operation of another illustrative manipulator 160, which can be located at an end of link 104D, according to an embodiment. FIGS. 7A, 7B show a top view and front view, respectively, of manipulator 160. Manipulator 160 includes a pair of restraining rods 162A, 162B and a contact component 164. Contact component 164 can be moved up/down with respect to restraining rods 162A, 162B via a piston 166 or the like. Restraining rods 162A, 162B are positioned above a low point of contact component 164 via a pair of vertical supports 168A, 168B that are spaced apart using a spacer 170, which is attached to link 104D using any solution. Each component of manipulator 160 that contacts one or more components of a rail vehicle 4A, 4B (FIG. 5) can have a smooth rounded cross section to reduce the risk of wear or damage to one or more components that are manipulated using manipulator 160.

Figure 7D:
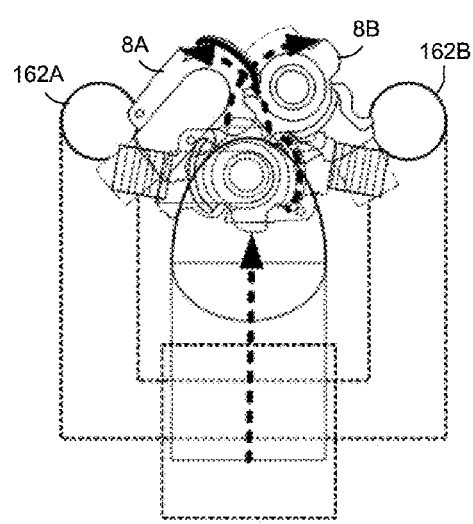

Processing component 36 (FIG. 1) can operate manipulator 160 to detach a pair of connectors 8A, 8B for a standard rail brake hose 126A, 126B (FIG. 5) on rail vehicles 4A, 4B. To this extent, FIGS. 7C, 7D show manipulator 160 being used to detach connectors 8A, 8B. Initially, processing component 36 can operate arm 102 (FIG. 1) to locate manipulator 160 so that each restraining rod 162A, 162B is located above the brake hose adjacent to a corresponding connector 8A, 8B, respectively, while contact component 164 is located below connectors 8A, 8B. The spacing between restraining rods 162A, 162B can be selected such that each restraining rod 162A, 162B can be located near where connectors 8A, 8B meet the brake hose. Further, processing component 36 can adjust a width of spacer 170 using any solution to enable the corresponding locations of restraining rods 162A, 162B to be adjusted. Similarly, a distance between a top of contact component 164 and a bottom of restraining rods 162A, 162B can be selected such that connectors 8A, 8B will readily fit between. Further, processing component 36 can adjust the distance by adjusting a length of vertical supports 168A, 168B and/or a height of contact component 164 using any solution (e.g., via piston 166).

Once manipulator 160 is positioned appropriately, processing component 36 can move contact component 164 upward toward connectors 8A, 8B using piston 166. Contact component 164 will force connectors 8A, 8B to move upward, while the brake hose 126A, 126B (FIG. 5) is prevented from moving upward by restraining rods 162A, 162B. As a result, connectors 8A, 8B will swivel away from one another, resulting in the hoses 126A, 126B becoming separated. Processing component 36 can confirm that the brake hoses have been decoupled using any solution (e.g., by analyzing image data of the work region, data from one or more pressure sensors located on manipulator 160, or the like). Once a successful decoupling operation is performed, processing component 30 can transmit its success to another system, such as management component 24 (FIG. 4), and wait for instructions or commence its next action.

Figure 8:
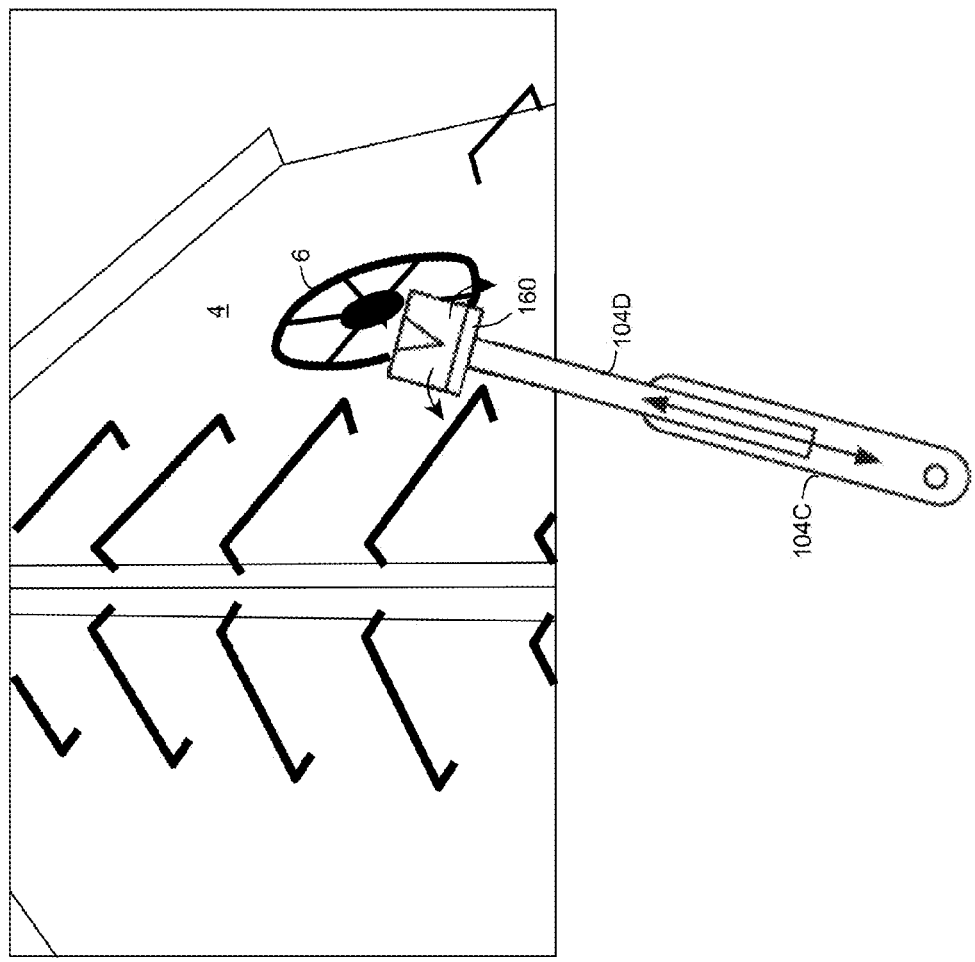
FIG. 8 shows illustrative use of the manipulator of FIG. 7 to rotate a brake wheel located on a front/back side of a railway vehicle according to an embodiment.

It is understood that manipulators 140, 160 and the functionality described therewith are only illustrative of numerous types of manipulation devices and functions, which can be implemented on vehicle 30 and utilized to perform a wide variety of tasks. To this extent, processing component 36 can utilize the same/similar components and processes described herein to perform additional actions in an operating environment, such as one or more repairs or maintenance tasks in a classification yard. For example, FIG. 8 shows illustrative use of manipulator 160 to rotate a brake wheel 6 located on a front/back side of a rail vehicle 4 according to an embodiment. Brake wheel 6 can be rotated to release stuck brakes on rail vehicle 4. Similarly, manipulator 160 can be utilized to bleed the brake system of a rail vehicle 4 by pulling an air system release lever located on the side of a rail vehicle 4. For example, manipulator 160 can grasp the release lever and the arm can be operated to pull the lever down to bleed off the air pressure for a few seconds. Additionally, vehicle 30 can operate a hose to clean a portion of the work area, such as a maintenance pit, between tracks, rail vehicles 4, and/or the like.

Further, manipulator 160 can be implemented with restraining rods 162A, 162B capable of movement similar to human fingers. In this case, in order to grasp an object, processing component 36 can implement grasp planning prior to moving the restraining rods 162A, 162B. The grasp planning can comprise, for example, one or more grasp planning optimization algorithms, such as grasp analysis, grasp workspace determination, grasp solution computation within the workspace, and/or the like. In an embodiment, vehicle 30 can comprise a pair of manipulators 160, each of which can be used to grasp one of a pair of disconnected brake hoses between two rail vehicles and attach the brake hoses, e.g., as part of assembling a consist for an outbound train.

Returning to FIG. 1, the set of action components 110 on vehicle 30 can be configured to acquire data for inspecting one or more aspects of an object. To this extent, processing component 36 can be configured to acquire measurement data for and/or perform maintenance on various components of a rail vehicle. For example, the set of action components 110 can comprise a non-destructive testing head, which can be applied to or placed in proximity with an object and used to acquire data regarding the object. In various embodiments, the testing head can comprise: an electromagnetic acoustic (EMAT)-based testing head, such as shown and described in U.S. Pat. No. 6,523,411; a handheld electronic gauge, such as shown and described in U.S. Pat. No. 7,525,667; a handheld measurement device, such as shown and described in U.S. Pat. No. 7,478,570; and/or the like. Processing component 36 can operate arm 102 to apply the testing head to various locations of a rail wheel and probe for flaws within the rail wheel (e.g., a crack), gather wheel stress measurements, gather dimensional measurements (e.g., diameter), and/or the like.

Similarly, the set of action components 110 can comprise a set of data acquisition devices, such as an imaging device, a chemical/biological sensor, an infrared imaging device (e.g., active illumination infrared camera or a passive infrared camera), a multi-spectral imaging device, or the like, which processing component 36 can locate accordingly to acquire measurement data, such as image data, chemical/biological levels, heat data, and/or the like, which processing component 36 can analyze to determine the presence of one or more unsafe conditions (e.g., a leak, hot brakes, uneven wear, hidden compartments, etc.). In an embodiment, a vehicle 30 can respond to an accident that may have resulted in a leak of hazardous material to determine a level and severity of the spill. Likewise, imaging device 46 and/or the set of action components 110 can be configured to acquire various types of image data for the surrounding area to perform security-related actions. For example, imaging device can acquire infrared image data, which processing component 36 can evaluate to determine the presence of unauthorized individuals in the work region regardless of scene clutter and/or weather conditions.

Moreover, vehicle 30A (FIG. 2) can be configured to perform track-related maintenance and/or inspection as it moves along the tracks. To this extent, vehicle 30A can be configured to visually inspect the track for defects, make track-based measurements (e.g., gauge, profile, etc.), make minor repairs to railway tie spikes or other track-related infrastructure, etc. Outside of the railway industry, embodiments of vehicle 30 can be configured to perform inspections of road-based vehicles, water-based vehicles, explosive ordinance disposal, remote inspection and/or monitoring, and/or the like.

For some applications, such as within classification yard 10 (FIG. 4), the rail vehicles may move unexpectedly, change direction, or be continuously moving. To this extent, referring to FIG. 1, robotic vehicle 30 can maneuver itself and align itself with a coupling or corresponding work region of a rail vehicle and secure itself with respect to the rail vehicle (e.g., by latching on to the release handle). Additionally, robotic vehicle 30 can align its tracks 42 to be parallel with the rail on which the rail vehicle is located. Alternatively, when robotic vehicle 30 is implemented as a rail-based vehicle 30A (FIG. 2), the corresponding rails can be aligned accordingly. Regardless, processing component 36 can disengage the clutch within transport component 40 to allow tracks 42 to move freely. In this manner, arm 102 and the components thereon can remain stationary with respect to the work region of a rail vehicle even if the rail vehicle is moving or suddenly starts/stops. Once vehicle 30 has completed the task, processing component 36 can unsecure vehicle 30 from the rail vehicle and re-engage the clutch to enable vehicle 30 to move on its own.

In an embodiment, processing component 36 can extend arm within the gap between a pair of connected vehicles. In this case, processing component 36 can implement a mechanical tracking solution, such as a stabilization platform, which stabilizes a position of the arm 102 with respect to the rail vehicles. In this case, vehicle 30 can include a sensor to acquire the speed of the rail vehicles and processing component 36 can adjust the speed of vehicle 30 with the speed of the rail vehicles to move in-step with the rail vehicles (e.g., track the movement of the rail vehicles). Processing component 36 can track the vehicle movement using image-based invariant feature tracking, particle filters, or perform binary correlation to match features in a spatio-temporal image stream with features of a template image of the target. Further, processing component 36 can implement finer adjustments by moving arm 102 in response to determining a difference in location for an object within a field of view of an imaging device, or the like.

It is understood that arm 102 and the various components for performing actions and/or acquiring data on an object can be implemented in a stationary location. For example, arm 102 can be permanently mounted adjacent to a rail line, such as rail line 14 (FIG. 4). Further, arm 102 can be permanently mounted between a pair of rails. In this manner, arm 102 and the components thereon, can be configured to acquire data/perform manipulations of various components located on the underside of the rail vehicles (e.g., brakes, suspension, axle, etc.). Further, arm 102 can access and manipulate the release handle 128 (FIG. 5) and/or brake hoses 126A, 126B (FIG. 5) of the coupling mechanism 120 (FIG. 5).

Figure 9:
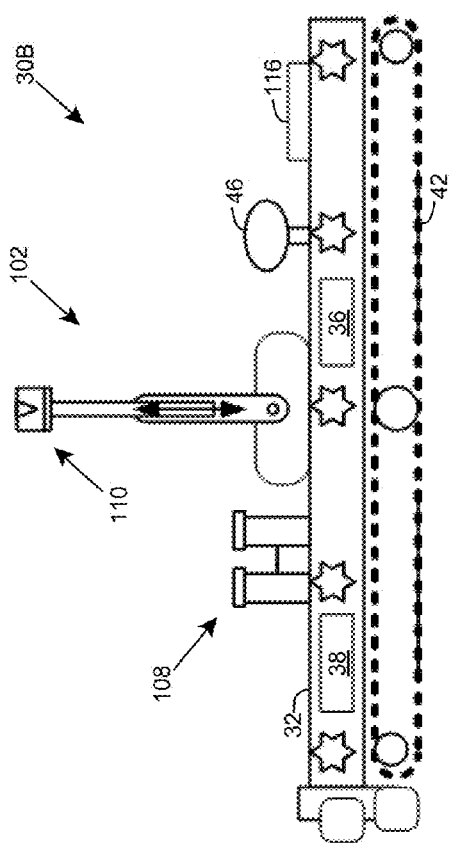
FIG. 9 shows a side view of another illustrative robotic vehicle according to an embodiment.

However, due to potential movement of rail vehicles, rather than an arm 102 at a fixed location, another embodiment provides a vehicle 30 configured to operate between a pair of rails on which rail vehicles travel. To this extent, FIG. 9 shows a side view of another illustrative robotic vehicle 30B according to an embodiment. Robotic vehicle 30B is configured to operate between a pair of rails. In this case, when arm 102 is not extended, vehicle 30B can comprise a profile that is approximately six inches high and a width that is approximately two feet or less. As illustrated, arm 102 can comprise a three-link arm, in which the first and second links rotate around connection points, and the third link, with the set of action components 110, can extend from the second link.

Figure 10:
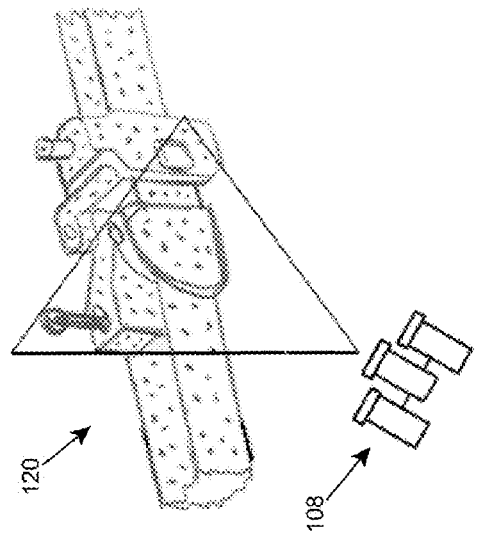
FIG. 10 shows an illustrative configuration in which the robotic vehicle of FIG. 9 can image a coupling mechanism from below using a set of imaging devices according to an embodiment.

When vehicle 30B is properly positioned, e.g., underneath the spacing between a pair of rail vehicles, processing component 36 can raise and extend the set of action components 110 to a desired location to perform the corresponding action(s). For example, the set of action components 110 can be configured to decouple the rail vehicles. To this extent, FIG. 10 shows an illustrative configuration in which vehicle 30B can image a coupling mechanism 120 from below using a set of visualization components 108 according to an embodiment. As illustrated, vehicle 30B (FIG. 9) can position the set of visualization components 108 to enable the capture of cross-sectional image data of the coupling mechanism 120.

Figure 11:
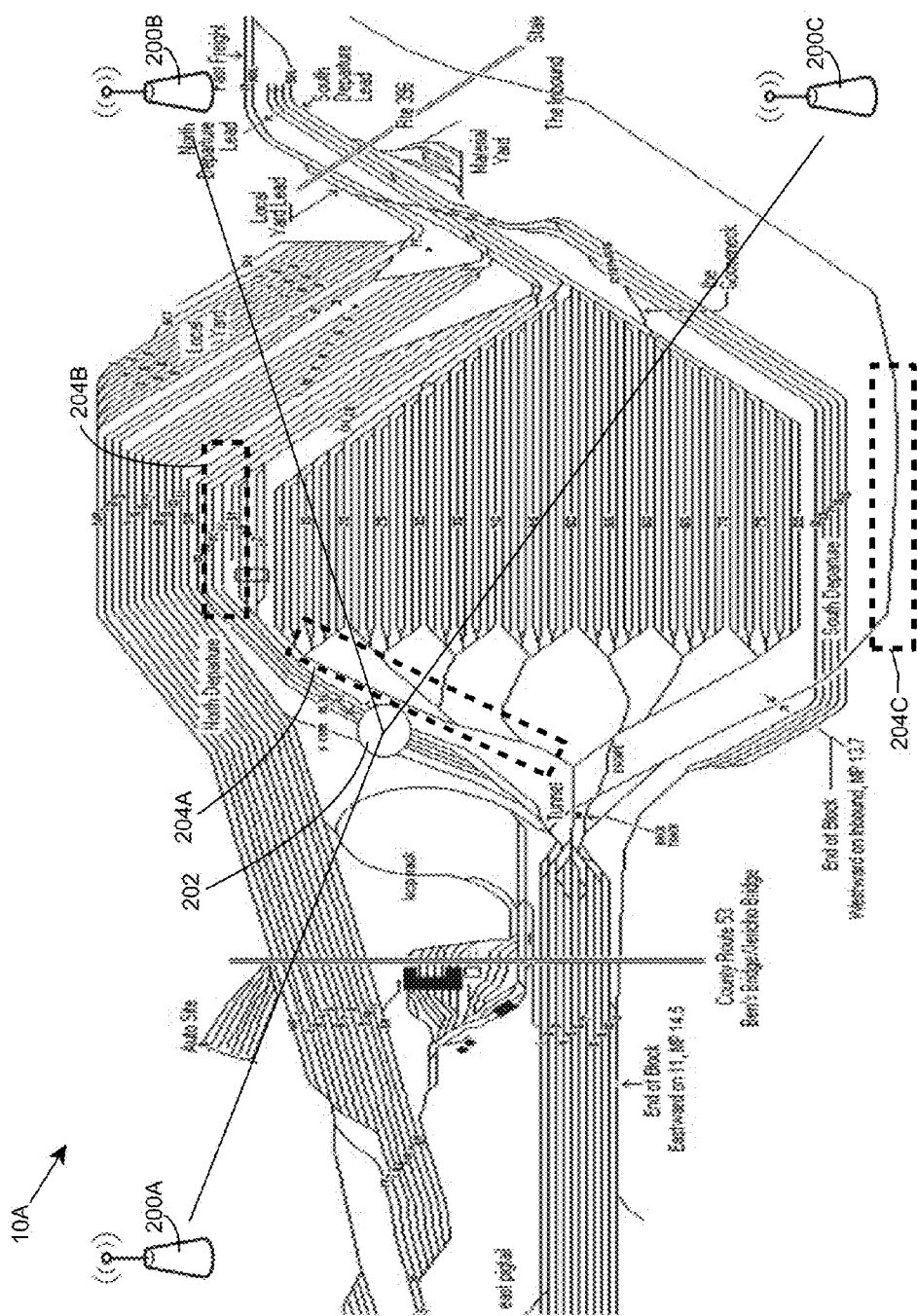
FIG. 11 shows a top view of a portion of a rail yard according to an embodiment.

Returning to FIGS. 1 and 4, an embodiment of vehicle 30 is configured to move throughout a rail yard, such as a classification yard 10, without its movement being limited to tracks, within tracks, or the like. To this extent, processing component 36 can be configured to determine a location of vehicle 30 within the classification yard 10. FIG. 11 shows a top view of a portion of a rail yard 10A according to an embodiment. As illustrated, the rail yard 10A comprises a large number of tracks that are configured in a structured manner. The various tracks can be as close as approximately ten feet to each other, which will require vehicle 30 to be capable of determining its location with a high degree of accuracy to avoid collision with rail vehicles moving on the tracks.

Rail yard 10A comprises numerous salient features that can be used to accurately location vehicle 30. For example, the rail tracks comprise recognizable patterns, as well as various other features, such as sign posts, roads, structures, and/or the like, can be identified on a highly accurate digital map of rail yard 10A. Processing component 36 can identify some of these features within image data captured by imaging device 46 and use their location to make periodic course corrections to the movement of vehicle 30. Additionally, processing component 36 can implement an algorithm, such as Kalman filters, to reduce location estimation errors.

Additionally, the map of rail yard 10A can be supplemented with information utilized by vehicle 30. For example, rail yard 10A can comprise several virtual cells 204A-204C. Each virtual cell 204A-204C can have a corresponding size, risk probability, volume, action list, maximum speed, and/or the like, associated therewith. Once within a virtual cell 204A-204C, processing component 36 can operate vehicle 30 accordingly. For example, in a virtual cell in which rail vehicles infrequently travel and are slow moving, processing component 36 can move vehicle 30 alongside a rail. However, in a virtual cell that comprises a high volume of and/or fast moving rail vehicles, processing component 36 can carefully analyze the rails before approaching a rail. In the case of decoupling rail vehicles, processing component 36 can direct vehicle 30 to a location of the first coupling mechanism to be decoupled based on the action list. It is understood that virtual cells 204A-204C are only illustrative, and rail yard 10A can comprise numerous virtual cells.

As discussed herein, vehicle 30 also can include a positioning component 38 (FIG. 1), which can comprise a geographic location radio signal receiver, which acquires geographic location information for vehicle 30 from a geographic location transmitter. To this extent, rail yard 10A is shown including a set of location transmitters 200A-200C, such as ultra-wideband location beacons, according to an embodiment. Each location transmitter 200A-200C can transmit a signal that is received by positioning component 38. Processing component 36 can process one or more attributes of the respective signals to determine an area 202 corresponding to a location of vehicle 30.

In another embodiment, a work environment, such as rail yard 10A, can be supplemented with one or more alternative markers for assisting vehicle 30 and processing component 36 in moving throughout the work environment. For example, a line can be painted on a surface along which vehicle 30 travels, which processing component 36 can utilize to route itself accordingly. Similarly, an emitting source, such as a buried wire emitting low levels of coded RF signal, a laser light emitter, or the like, can be used to assist vehicle 30 in guiding itself along a predetermined path. Still further, other markers, such as an edge of maintenance pit, one or a pair of side by side tracks, an overhead sentry, and/or the like, can be utilized by processing component 36 to determine a path of travel.

Once vehicle 30 is located in a roughly desirable location, e.g., within a virtual cell 204A-204C, vehicle 30 must be positioned sufficiently close to the required task, such as decoupling rail vehicles. Initially, processing component 36 can locate the area for the work location, e.g., the location of a coupling mechanism to be decoupled. To this extent, processing component 36 can determine the correct rail vehicles to be decoupled in a stream of connected rail vehicles using any solution. For example, processing component 36 can identify a particular rail vehicle in a consist to determine whether the rail vehicle is one to be decoupled or to determine a relative location of the rail vehicle with respect to the decoupling location.

Further, processing component 36 can detect the end of rail vehicles to determine a location of the coupling mechanism. In an embodiment, processing component 36 can process data received from the set of collision avoidance sensors 48 to determine the start/end of each rail vehicle. Additionally, processing component 36 can receive data from an external vehicle sensing system, which is implemented within rail yard 10A. In this case, the external vehicle sensing system can provide an output signal indicating the end of a rail vehicle and the beginning of the next rail vehicle, which processing component 36 can use to determine the area between the rail vehicles. Processing component 36 also can process image data acquired by imaging device 46 to identify the work location, e.g., by identifying a loop figure, which indicates connected brake hoses for a coupling mechanism.

As discussed herein, vehicle 30 can be provided with a set of actions, which can subsequently be carried out autonomously be vehicle 30. In an embodiment, an off the shelf robot programming environment, such as one provided by Mobilerobots, Inc., Robotics Developer Studio from Microsoft, Inc., and/or the like, can be utilized to program the actions for processing component 36. For example, an illustrative set of instructions provided by a user (e.g., via voice input, menu selection, or the like) for processing component 36 to implement using the various components of vehicle 30 can comprise: "go to track 5 left side"; "wait until end of car detected"; "wait for decoupling order"; "confirm vehicle identity"; "look for pin puller lever"; "grab lever"; "release car"; "confirm release"; "repeat until end-of-train".

While vehicle 30 is generally described herein as being configured for autonomous operation in response to receiving a set of tasks from another system, it is understood that vehicle 30 can operate in semi-autonomously, during which a remote user can control vehicle 30 to perform one or more tasks and/or assist vehicle 30 in performing one or more assigned tasks. For example, processing component 36 can transmit image data captured by imaging devices 46, 114A, and/or 114B for presentation to the remote user. Additionally, processing component 36 can transmit data acquired by other sensors, such as microphone array 47 for presentation to the remote user. Data from imaging device 46 and microphone array 47 can provide situational awareness for the remote user, and processing component 36 and/or a remote system can analyze and supplement the data with analysis information (e.g., identified objects within the field of view, directional information of a source of a sound, and/or the like). Data from imaging devices 114A, 114B can be utilized by the remote user to perform/assist processing component with performing the task(s).

Figure 12:
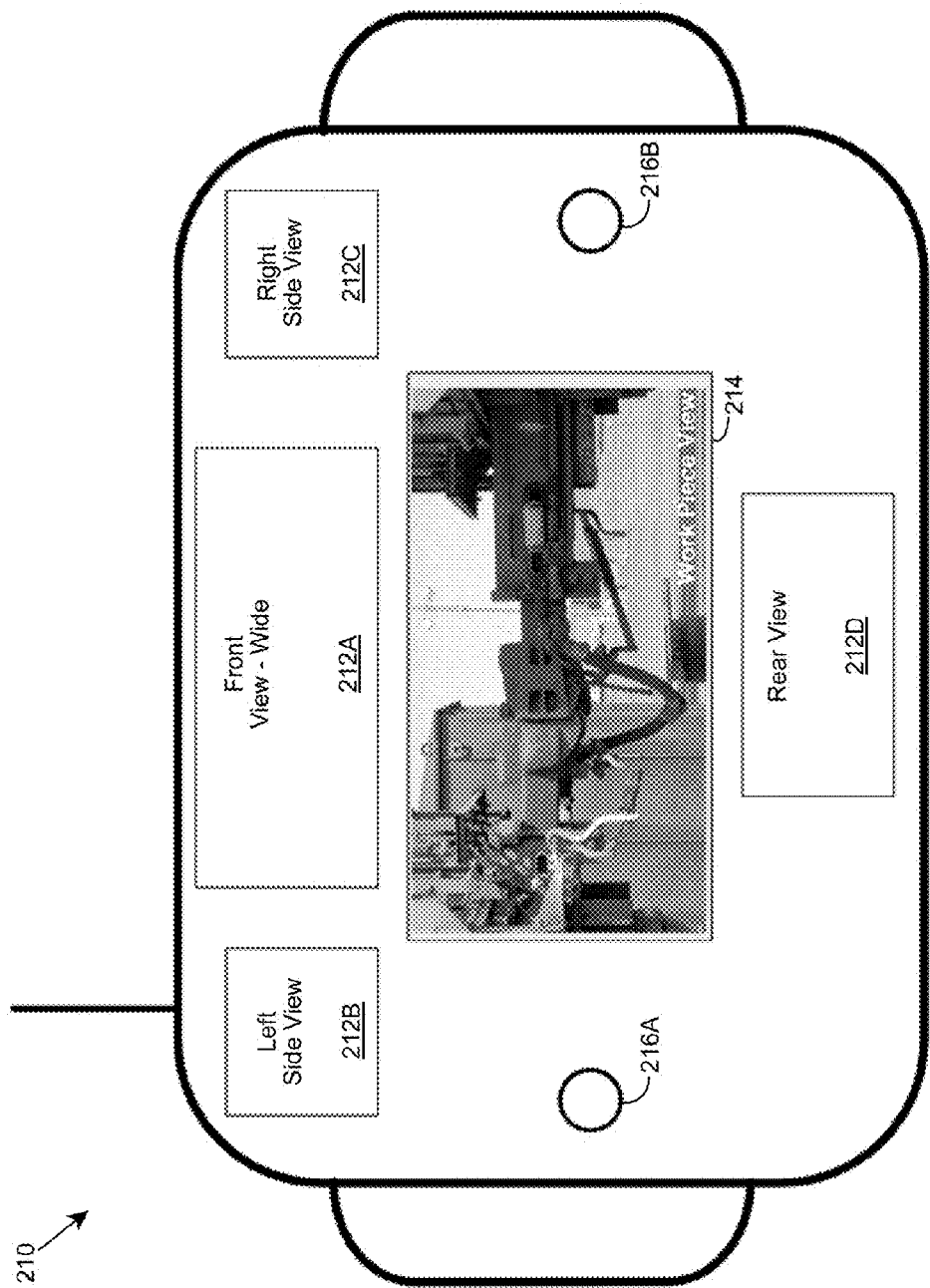
FIG. 12 shows an illustrative user interface panel for a remote user according to an embodiment.

FIG. 12 shows an illustrative user interface panel 210 for a remote user according to an embodiment. Panel 210 includes five display areas 212A-212D, 214. Display areas 212A-212D provide different views acquired by imaging device 46, and can provide the remote user with situational awareness regarding the environment around vehicle 30. Each display area 212A-212D corresponds to a different portion of an area around vehicle 30, e.g., every ninety degrees of a circle around the vehicle 30. Display area 214 provides display information for the work region, which the remote user can utilize to perform one or more actions. Processing component 36 can generate and transmit data for the display areas 212A-212D, 214 using any solution.

In an embodiment, processing component 36 compresses the image data acquired from the imaging devices using, for example, the JPEG 2000 compression algorithm enhanced for low latency operation, and processing component 36 can transmit the image data for presentation on panel 210 using a high speed 801.11 wireless network. In this manner, the remote user will be presented with a near real time view of the various locations to enable precise control of one or more components of vehicle 30. It is understood that the update periods and image quality, and therefore the corresponding algorithms for generating and transmitting the image data, for display areas 212A-212D can differ from that of display area 214, the latter of which can be most important for performing actions using vehicle 30. For display area 214, a latency of approximately ten milliseconds or less is generally adequate for a slow speed remote operation.

Additionally, panel 210 can include one or more input devices for enabling the remote user to remotely control the operation of one or more components of vehicle 30. For example, panel 210 is shown including a pair of joysticks 216A, 216B, which can enable the remote user to operate any combination of the various components on vehicle 30 using any solution. It is understood that any type of input device can be utilized, including a touch screen or the like, which a remote user can utilize to point out an object within a field of view of vehicle 30, the bounding area 134, and/or the like. Using coordinate geometry, processing component 36 can determine the object's coordinates with respect to vehicle 30 by employing a range sensor, laser range finder, and/or the like, and combining the range information with the imaging device's field of view using camera calibration solutions. Further, panel 210 can include alternative and/or additional input/output devices, such as a speaker, which can present audible data acquired by vehicle 30, a microphone, and/or the like. The remote user can designate one or more operations, e.g., using a speech recognition software or the like, which can be interpreted into commands transmitted for processing by processing component 36. While a separate panel 210 is illustrated, it is understood that the various display areas can be presented on a standard monitor using a general purpose computing device executing computer program code configured to manage data for the various display areas, and the input devices can comprise input devices for the general purpose computing device, the interaction of which is converted into a set of actions to be performed by component(s) located on the vehicle 30 by computer program code executing on the computing device that is configured to interpret the interactions into the set of actions.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A vehicle comprising:
a transport component including:
a motor;
a set of wheels; and
means for selectively engaging the set of wheels with the motor;
a set of action components, the set of action components including at least one securing action component configured to be temporarily secured with respect to a target object external to the vehicle for performing a task on the target object;
means for performing the task on the target object, the means for performing being configured to perform a process including:
moving the at least one securing action component to temporarily secure the at least one securing action component with respect to the target object;
operating the means for selectively engaging to disengage the motor from the set of wheels in response to the at least one securing action component being temporarily secured with respect to the target object;
performing the task on the target object using at least one of the set of action components;
unsecuring the at least one securing action component from the target object in response to completing the performing; and
operating the means for selectively engaging to re-engage the motor to the set of wheels in response to the unsecuring.

2. The vehicle of claim 1, the means for moving comprising an arm including a plurality of links, wherein the set of action components are located on the arm, the vehicle further comprising means for disengaging at least one link of the multi-link arm in response to the at least one securing action component being temporarily secured with respect to the target object.

3. The vehicle of claim 1, wherein the target object comprises a component of a rail vehicle.

4. The vehicle of claim 1, wherein the set of action components includes a manipulator configured to decouple a pair of rail vehicles.

5. The vehicle of claim 1, further comprising:
a first imaging device configured to acquire location image data for the vehicle;
a set of visualization components configured to capture work region image data of a region including the target object; and
a processing component configured to process the location image data and operate the transport component to move the vehicle using the location image data and process the work region image data and create a three-dimensional representation of objects in the work region based on the work region image data.

6. The vehicle of claim 5, wherein the means for performing the task on the target object includes the processing component, and wherein the processing component is configured to operate the transport component and move the at least one securing action component autonomously.

7. The vehicle of claim 1, wherein the motor is configured to drive at least one wheel that rotates a set of tracks.

8. A railway maintenance device comprising:
a multi-link arm, each link capable of independent movement in at least one direction;
a set of visualization components configured to capture work region image data for a region including at least one target object;
an action component located on a link of the multi-link arm; and
a processing component configured to perform a railway maintenance operation by:
moving at least one of the links to place the action component near a target object in the region using the work region image data;
disengaging at least one link of the multi-link arm in response to the action component being temporarily secured with respect to the target object to enable the at least one link to move freely; and
operating at least one of: the arm or the action component, to perform the railway maintenance operation with the at least one link disengaged.

9. The device of claim 8, further comprising:
a location imaging device configured to acquire location image data having a second field of view distinct from the work region image data; and
a transport component configured to enable the device to move independently, wherein the processing component is further configured to process the location image data and operate the transport component to move the vehicle using the location image data.

10. The device of claim 9, further comprising a positioning component configured to receive a set of location signals, wherein the processing component is further configured to process the set of location signals to determine a location of the device and use the location of the device to move the device.

11. The device of claim 10, wherein the positioning component is further configured to acquire dead-reckoning data, and wherein the processing component further uses the dead-reckoning data to determine the location of the device.

12. The device of claim 9, wherein the processing component is configured to identify at least one feature in the location image data included in a digital map of a work environment and adjust movement of the device based on a location of the at least one feature with respect to the device.

13. The device of claim 8, wherein the railway maintenance operation comprises at least one of: decoupling a pair of rail vehicles, detaching a pair of brake hoses, attaching a pair of brake hoses, or acquiring inspection data for a rail vehicle.

14. A rail environment comprising:
a railway maintenance device configured to perform each of a plurality of railway maintenance operations including: decoupling a pair of rail vehicles; detaching a pair of brake hoses; attaching a pair of brake hoses; and acquiring inspection data for a rail vehicle, the device comprising:
a multi-link arm, each link capable of independent movement in at least one direction;
a set of visualization components configured to capture work region image data for a region including at least one target object;
an action component located on a link of the multi-link arm; and
a processing component configured to perform at least one of the plurality of railway maintenance operations by:
moving at least one of the links to place the action component near a target object in the region using the work region image data;
disengaging at least one link of the multi-link arm in response to the action component being temporarily secured with respect to the target object to enable the at least one link to move freely; and
operating at least one of: the arm or the action component, to perform the at least one of the plurality of railway maintenance operations with the at least one link disengaged.

15. The rail environment of claim 14, wherein the railway maintenance device is located between a pair of rail tracks for a rail line.

16. The rail environment of claim 14, the railway maintenance device further comprising:
a location imaging device configured to acquire location image data having a second field of view distinct from the work region image data; and
a transport component configured to enable the device to move independently, wherein the processing component is further configured to: process the location image data; operate the transport component to move the device using the location image data autonomously; and disengage a motor in the transport component from a set of wheels in the transport component in response to the action component being temporarily secured with respect to the target object.

17. The rail environment of claim 16, further comprising means for assisting the device in moving within a work environment.

18. The rail environment of claim 17, wherein the means for assisting comprises a plurality of wireless geographic location transmitters, each location transmitter configured to transmit location information, and wherein the processing component is further configured to move the device using the location information.

19. The rail environment of claim 17, wherein the means for assisting comprises a set of rail tracks, wherein the device comprises a rail-based vehicle.

20. The rail environment of claim 17, wherein the means for assisting comprises a set of markers, and wherein the processing component is further configured to acquire data on a location of a marker in the set of markers and move the device using the location of the marker.

* * * * *